(12) United States Patent
Kato et al.

(10) Patent No.: US 7,757,022 B2
(45) Date of Patent: Jul. 13, 2010

(54) INTEGRATED CIRCUIT DEVICE AND SIGNAL TRANSMISSION SYSTEM

(75) Inventors: Naoki Kato, Kodaira (JP); Yasuhiko Sasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 129 days.

(21) Appl. No.: 11/630,387

(22) PCT Filed: Aug. 4, 2004

(86) PCT No.: PCT/JP2004/011516

§ 371 (c)(1),
(2), (4) Date: Dec. 22, 2006

(87) PCT Pub. No.: WO2006/013641

PCT Pub. Date: Feb. 9, 2006

(65) Prior Publication Data

US 2008/0052430 A1    Feb. 28, 2008

(51) Int. Cl.
*G06F 13/12* (2006.01)
*G06F 13/38* (2006.01)

(52) U.S. Cl. ...................................................... 710/71
(58) Field of Classification Search .................... 710/71
See application file for complete search history.

(56) References Cited

U.S. PATENT DOCUMENTS

| | | | |
|---|---|---|---|
| 4,823,305 A * | 4/1989 | Holdren et al. | 710/30 |
| 4,855,994 A * | 8/1989 | Takeuchi et al. | 370/480 |
| 5,414,830 A * | 5/1995 | Marbot | 710/71 |
| 5,655,153 A * | 8/1997 | Sandorfi | 710/38 |
| 5,835,498 A * | 11/1998 | Kim et al. | 370/537 |
| 5,862,367 A * | 1/1999 | Chiao-Yen | 710/71 |
| 5,877,712 A * | 3/1999 | Kim | 341/68 |
| 7,106,103 B2 * | 9/2006 | Smith et al. | 326/82 |
| 2002/0073230 A1 * | 6/2002 | Konig | 709/237 |

(Continued)

FOREIGN PATENT DOCUMENTS

JP     55157068 A    *  12/1980

(Continued)

OTHER PUBLICATIONS

International Search Report of PCT/JP2004/011516 mailed Dec. 7, 2004.

(Continued)

*Primary Examiner*—Alford W Kindred
*Assistant Examiner*—Farley J Abad
(74) *Attorney, Agent, or Firm*—Stites & Harbison PLLC; Juan Carlos A. Marquez, Esq.

(57) ABSTRACT

Some interface signals are selected from among signals of a plurality of different parallel interfaces, then being multiplexed onto a serial connection. A transmitter of a signal transmission system includes an interface-signal selector IFS, and a transfer programmer TP for issuing a control signal to instruct the selection from among the parallel interfaces. The transfer programmer TP implements the multiplexing of the selected interface signals in such a manner that the specification of the parallel interfaces is satisfied. Also, the transfer programmer TP changes, as occasion requires, the control signal to instruct which interfaces to select. This change allows the interface signals to be multiplexed onto the serial connection while dynamically changing the interface signals to be multiplexed.

7 Claims, 22 Drawing Sheets

U.S. PATENT DOCUMENTS

2003/0204671 A1 * 10/2003 Matsunami et al. ......... 711/112

FOREIGN PATENT DOCUMENTS

| | | |
|---|---|---|
| JP | 05-113838 | 10/1991 |
| JP | 06-096017 | 5/1992 |
| JP | 06-103025 | 9/1992 |
| JP | 2003-298545 | 3/1995 |
| JP | 10-022838 | 7/1996 |
| JP | 10-093543 | 9/1996 |
| JP | 2000-324896 | 5/1999 |
| JP | 2001-189770 | 12/1999 |
| JP | 2001-308958 | 4/2000 |
| JP | 2003-198356 | 12/2001 |
| KR | 2000-0016664 | 12/1998 |
| WO | WO 97/48056 | 6/1997 |

OTHER PUBLICATIONS

"Digital Circuit", Colona Publishing Ltd., (1982), pp. 108-111 in Japanese, and 2 pages of English translation.

* cited by examiner

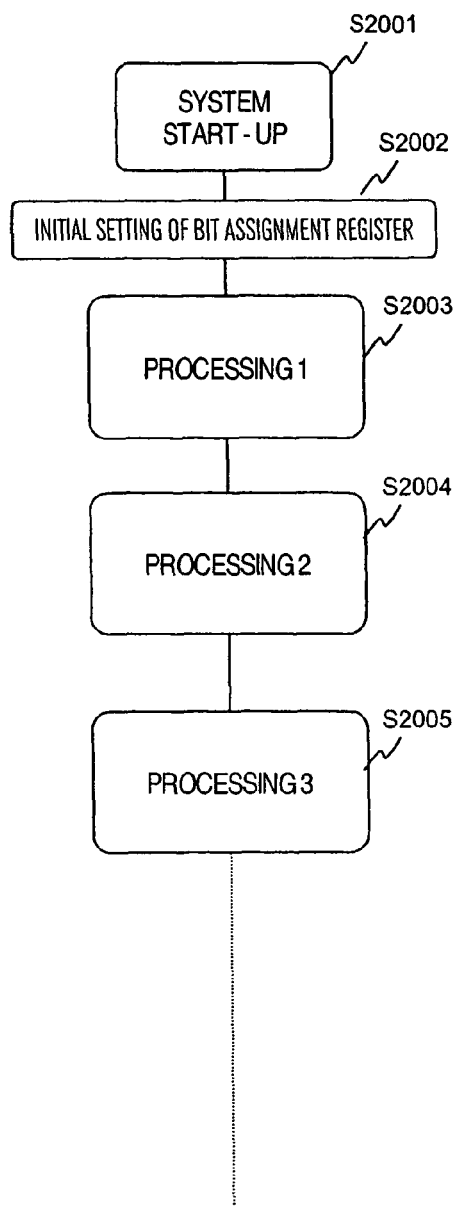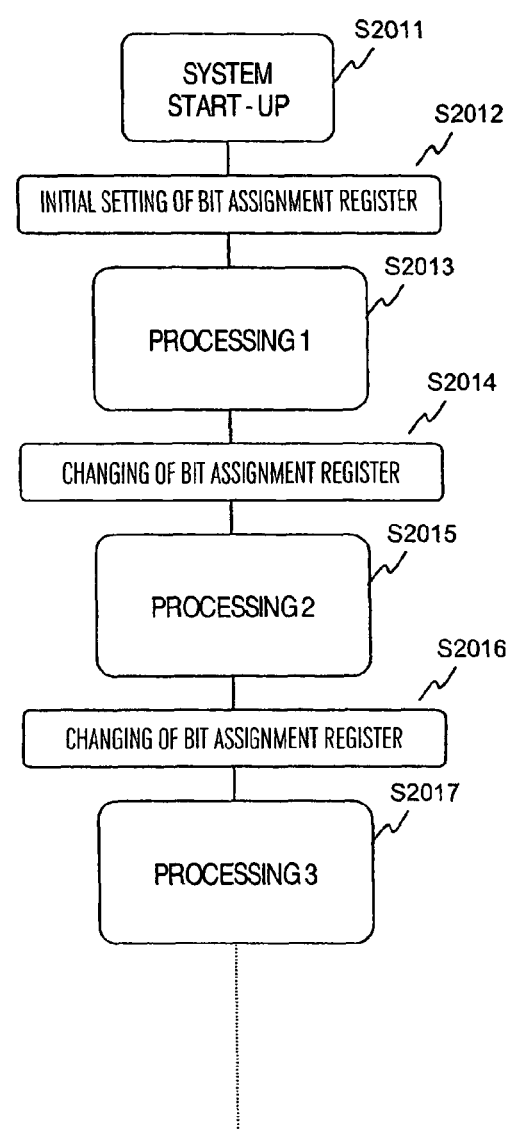

INTEGRATED CIRCUIT DEVICE AND SIGNAL TRANSMISSION SYSTEM

TECHNICAL FIELD

The present invention relates to an integrated circuit device for transmitting parallel data of a plurality of parallel interfaces at a high speed in such a manner that the parallel data are selectively serialized. More particularly, it relates to a signal transmission system on which such an integrated circuit device is mounted.

BACKGROUND ART

In general, in many systems, it becomes necessary to perform passing of a signal between the respective parts or respective appliances which configure each system. The signal of this kind is, e.g., a data signal becoming a target to be processed, or each type of control signal. In order to accomplish an object like this, it is now widely performed to establish a connection between semiconductor chips or parts in accordance with signal passing methods (methods of receiving and delivering signals) which are referred to as "interfaces". These interfaces define information such as transmission frequency, bit width of a data signal, configuration of each control signal, and transmission/reception protocol concerned. As the interfaces for performing the passing of a signal like this, there exist an interface where the bit width of a data signal includes a plurality of bit widths (hereinafter, referred to as "parallel interface"), and an interface where the bit width of a data signal includes only a single bit width (hereinafter, referred to as "serial interface"). Incidentally, here, the passing of a signal having a single bit width does not require that the number of signal lines is one, but includes a case as well where the transmission is performed using signals whose phases are different (e.g., mutually complementary signals with a normal phase and an opposite phase).

Conventionally, with an object of reducing the number of the signal lines, there have existed technologies on the following parallel/serial conversion and serial/parallel conversion: Namely, first, parallel signals of the parallel interface are serialized temporarily. Next, the resultant serial signal is transmitted between appliances, between parts, or between semiconductor chips by using the serial interface. Finally, the serial signal transmitted is reconstructed to the parallel signals again. Documents which can be cited as the technologies like this are as follows: Tadao Saito, "Digital Circuit", Colona Publishing Ltd., 1982, pp. 108-110 (Prior Art 1), JP-A-6-103025 (Prior Art 2), JP-A-6-96017 (Prior Art 3), and JP-A-10-22838 (Prior Art 4).

DISCLOSURE OF INVENTION

The technology disclosed in (Prior Art 1) is as follows: Namely, parallel data belonging to a certain single interface are converted into a serial signal by a transmitter, then being transmitted thereby. Moreover, the serial signal transmitted is reconstructed to the parallel data again by a receiver so as to be utilized. Since the passing of the signal is performed by using the serial connection, the number of wiring lines can be reduced. This feature decreases the number of wirings on a cable and a printed board, thereby making it possible to obtain such effects as a downsizing in each appliance and a reduction in the system cost. When there exist a plurality of different parallel interfaces, however, no investigation has been made concerning serialization or parallelization in a case where signals of the plurality of different parallel interfaces are employed as the targets of the serialization or parallelization. Here, the plurality of different parallel interfaces refer to a situation where there exist a plurality of parallel interfaces which differ from each other in at least any one of the transmission frequency, the bit width of a data signal, the configuration of each control signal, and the transmission/reception protocol concerned. Regarding the parallel/serial conversion and serial/parallel conversion disclosed in (Prior Art 2), a similar problem also exists. Also, the technology disclosed in (Prior Art 3) is as follows: This technology multiplexes signals among a plurality of devices, and takes advantage of the serial connection as a bus connection for the plurality of devices (three devices in FIG. 1). Here, a technology is disclosed which prevents the plurality of devices from sending out the signals simultaneously by allocating, beforehand in time, which devices will send out the signals onto the serial connection. In this technology as well, no investigation has been made concerning the serialization of parallel signals of a plurality of different parallel interfaces. Moreover, since this technology is premised on the bus connection, it is conceivable that there will occur the following problem: Namely, the passing of a signal becomes difficult at a high speed (high frequency) due to influences of the signal reflection at a branch portion of the signal lines.

Looking at the fact that a large number of integrated circuits are mounted in one system and these integrated circuits are connected to each other via a large number of parallel signals, the inventors have noticed that, on account of this fact, there exists a fear of hindering a downsizing in the system and a reduction in the system cost, and eventually, there exists a fear of hindering extensibility of the system. From this recognition, the inventors have envisioned and devised the configuration concept of the present invention, i.e., parallel signals of a plurality of different parallel interfaces are serially transmitted in a selective manner. Furthermore, there is provided a network-connected system configuration which is effective when some signals are selected from among signals of a plurality of different parallel interfaces like this, and are transmitted in such a manner that the signals selected are multiplexed. Meanwhile, the technology disclosed in (Prior Art 4) is as follows: Namely, in communications units denoted by 5 to 8 in FIG. 1, signals of a plurality of different parallel interfaces are serialized in batch. After that, the resultant serial signal is transmitted between the devices, then being reconstructed by being parallelized. The communications units like this merely statically serialize the parallel signals of the plurality of devices determined in advance. Namely, no consideration is given to the selective serialization of some signals from among the interface signals of the plurality of devices, or to implementation of a dynamical change in the selection.

Of the present invention to be disclosed, the brief explanation of overview of its representatives is as follows: An integrated circuit device for multiplexing parallel data of a plurality of parallel interfaces into serial data includes a storage device, a signal send-out circuit for outputting data on a one-bit basis to a transmission path connected to the integrated-circuit device, the data being stored in the storage device, an interface-signal selector for selecting parallel interfaces from among the plurality of parallel interfaces, and outputting parallel data of the selected parallel interfaces to the storage device, the interface-signal selector being so configured as to be able to input the parallel data of the plurality of parallel interfaces, and a transfer programmer for issuing a control signal to the interface-signal selector, the control signal notifying the interface-signal selector of the parallel interfaces which should be selected thereby.

Also, a chip for receiving a serial signal includes a first register concerning frame structure of the serial transmission, and extracts corresponding data in accordance with the first register. Also, a chip for transmitting the serial signal includes a second register concerning the frame structure of the serial transmission, and creates the serial data from the corresponding data in accordance with the second register. This register can also be made changeable.

Also, in the transmission based on the parallel interfaces, depending on a board on which the integrated circuit device is mounted, the transmission frequency, and the transmission band, either the serial transmission or the parallel transmission is used separately, i.e., the parallel data are transmitted directly, or the parallel data are serially transmitted in a manner of being serialized.

Hereinafter, referring to embodiments, the detailed explanation will be given below concerning the integrated circuit device and the signal transmission system according to the present invention.

BRIEF DESCRIPTION OF DRAWINGS

FIG. 16 is a diagram for illustrating a set method for setting a bit assignment register of the present invention;

BEST MODE FOR CARRYING OUT THE INVENTION

Hereinafter, referring to the accompanying drawings, the detailed explanation will be given below concerning preferred embodiments of the signal transmission system according to the present invention and the integrated circuit device used therefor.

Figure 1:
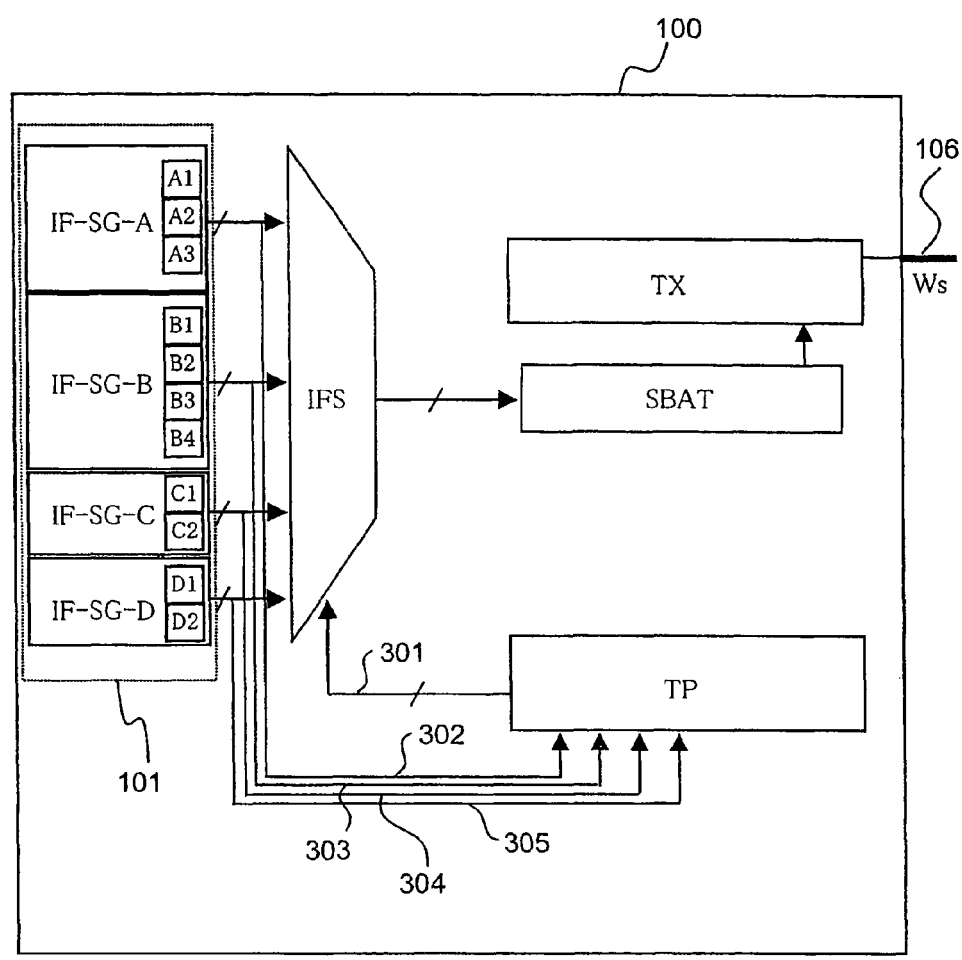
FIG. 1 is a diagram for illustrating a configuration of a signal transmitter in the signal transmission system of the present invention.

Referring to FIG. 1, the explanation will be given below concerning the basic configuration of a signal transmitter 100 in the signal transmission system. This signal transmitter 100 includes a signal generation circuit 101 for generating signals corresponding to a plurality of parallel interfaces IF-A to D. The signal transmitter 100 serializes the output data generated from the signal generation circuit 101, then sending out the resultant serial data onto a transmission path 106.

Signal generation circuits IF-SG-A to D are provided in a one-to-one correspondence relationship with the respective parallel interfaces IF-A to D. Each of the signal generation circuits IF-SG-A to D generates the value of each bit of each parallel interface IF corresponding thereto. Each signal generation circuit IF-SG is configured in a similar way to the conventional signal generation circuit for a single interface. An interface-signal selector IFS selectively extracts signals from among the each-interface-based signals generated by the signal generation circuits IF-SG-A to D, then outputting the selectively extracted signals to a serial bit array SBAT. The operation of the interface-signal selector IFS is controlled by a control signal 301 issued from a transfer programmer TP. The control signal 301 instructs the interface-signal selector IFS which interfaces to select. The serial bit array SBAT, which is a memory or register, receives the output from the interface-signal selector IFS, then holding the output as a serial bit string.

A signal send-out circuit TX converts the data stored in the serial bit array SBAT into data at a voltage or current level which matches the physical specification prescribed for the transmission path 106. After that, the circuit TX sends out this data onto the transmission path 106. When the signal send-out circuit TX outputs front-end bit data of the data stored in the serial bit array SBAT, the serial bit array SBAT shifts its internal data by 1 bit in the front-end side direction. This allows the signal send-out circuit TX to always extract front-end bit data of the data stored in the serial bit array SBAT. Accordingly, then, after converting the front-end bit data into data at the voltage or current level which matches the prescribed physical specification, the circuit TX has only to send out this data onto the trans mission path 106.

Figure 2:
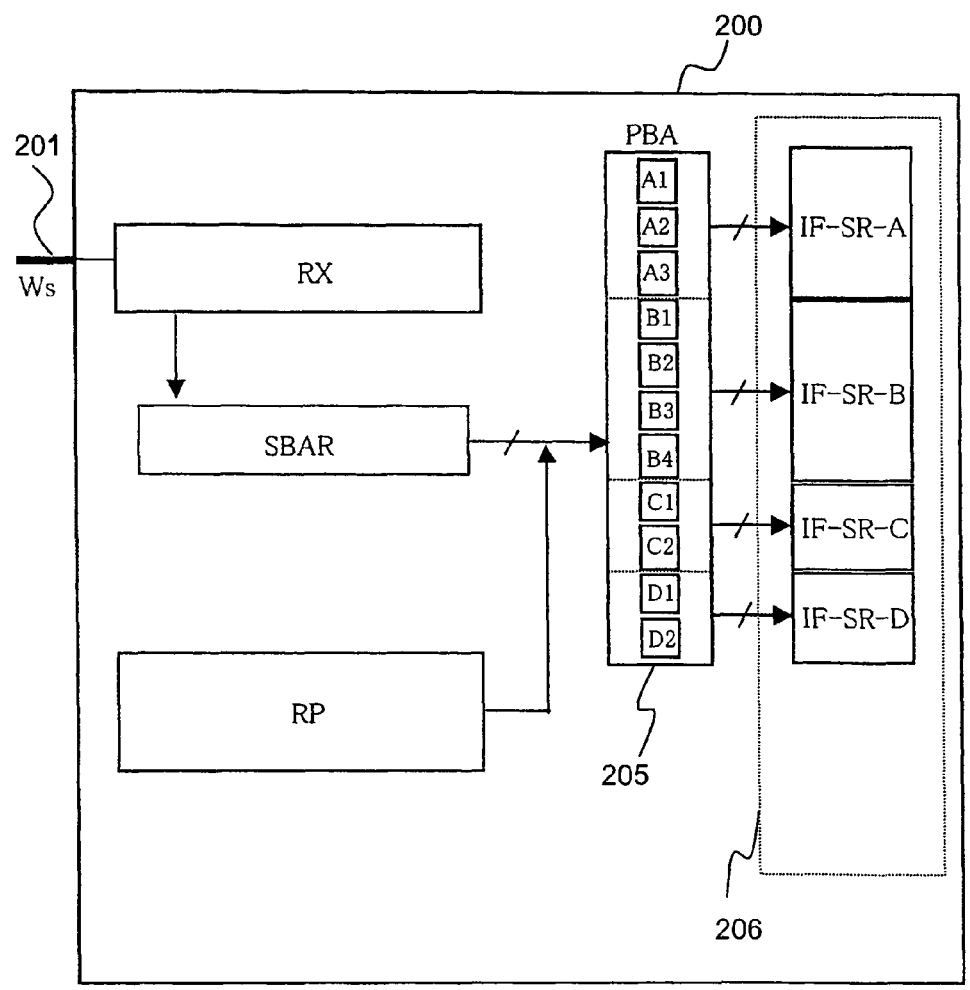
FIG. 2 is a diagram for illustrating the configuration of the signal transmitter in the signal transmission system of the present invention.

Also, referring to FIG. 2, the explanation will be given below regarding the basic configuration of a signal receiver 200 in the signal transmission system. A signal reception circuit RX receives the signal from a transmission path 201 at a voltage or current level which matches the physical specification prescribed for the transmission path 201, then converting the signal into a signal at a signal level to be used in the signal receiver 200. The signal level resulting from the conversion is, generally, a signal level of the digital data used inside the system or the semiconductor integrated circuit.

A serial bit array SBAR, which is a memory or register, holds the data, whose signal level has been converted by the signal reception circuit RX, as a serial data bit string. Here, when the signal transmitter 100 has sent out the serial signal onto the transmission path, a reception programmer RP receives, from the signal transmitter 100, information as to which interfaces had been selected from among the plurality of interfaces, and in what order the parallel signals of the selected interfaces had been multiplexed. Then, based on this information, the reception programmer RP reconstructs the data stored in the serial bit array SBAR to the data of the plurality of parallel interfaces before being multiplexed. Moreover, the reception programmer RP outputs the reconstructed data to a parallel bit array PBA as the parallel data of the respective parallel interfaces. The parallel bit array PBA is a memory or register for holding the parallel data of the respective interfaces. The parallel data outputted to the parallel bit array PBA are passed to signal reception circuits IF-SR-A to D which correspond to the respective parallel interfaces.

In this way, in the signal transmitter 100 and the signal receiver 200, the transfer programmer TP and the reception programmer RP respectively control which interfaces to select from among the plurality of interfaces to perform the multiplexing and the reconstruction. In accordance with a procedure whereby the parallel signals of the interfaces selected by the signal transmitter 100 are multiplexed onto the serial connection, the signal receiver 200 is required to perform the reconstruction of the data before the selected interfaces are multiplexed. Accordingly, the reception programmer RP must identify which interfaces had been multiplexed and, of the serial data resulting from the multiplexing, which parts correspond to which interfaces. Methods which are conceivable for implementing this identification are, basically, as follows: (1) the multiplexing is fixed as a module, (2) the multiplexing information is included for each frame of the serial data, and (3) the multiplexing information is transmitted only when the multiplexing method is changed. The method (1) can be implemented most simply when the system has enough idle capacity, and the method (3) exhibits high flexibility and good transmission efficiency.

Hereinafter, the explanation will be given below concerning the methods whereby the transfer programmer TP in the signal transmitter 100 selects some interfaces from among the plurality of interfaces, and multiplexes the selected interfaces. FIG. 1 illustrates an example of the first multiplexing method. The transfer programmer TP monitors output signals (302, 303, 304, and 305) from the signal generation circuits IF-SG-A to D of the plurality of interfaces, thereby selecting interfaces to be stored into the serial bit array SBAT. The first example is suitable for a protocol which, of signals prescribed as protocols, has the specification that a specific bit (or a bit group) is changed when starting the transmission. For example, the PCI interface, which is widely used as one of the standard interfaces, belongs to such interfaces. In the PCI interface, prior to the transmission of data, FRAME signal is set at a low level. The transfer programmer TP detects that such a specific bit or bit group (e.g., FRAME signal in the case of the PCI interface) is changed, thereby being capable of knowing that the interface is going to start the transmission. Consequently, the transfer programmer TP selects, from among the plurality of interfaces, some interfaces for which the transfer programmer TP detects that a specific bit or bit group is changed. Then, the transfer programmer TP transfers the signals of these selected interfaces to the serial bit array SBAT.

Figure 3:
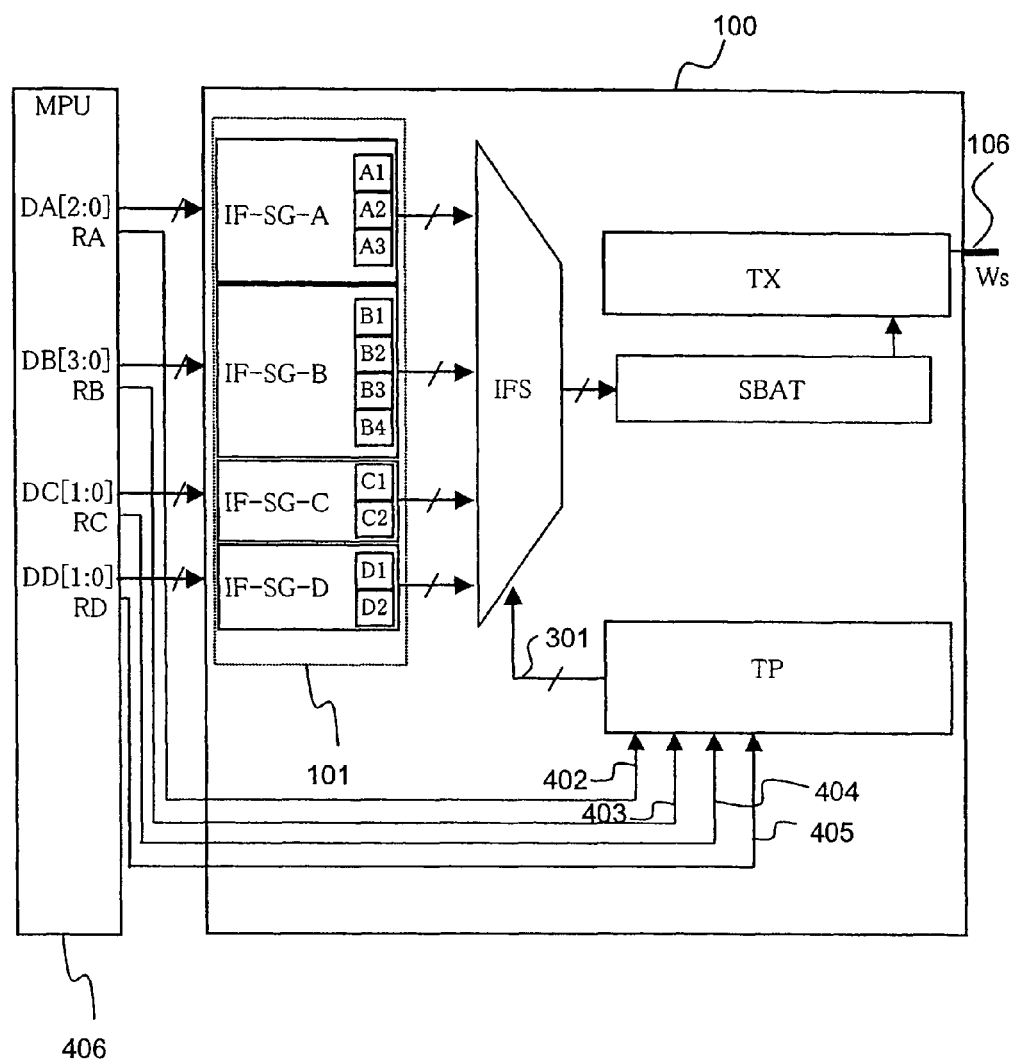
FIG. 3 is a diagram for illustrating another configuration of the signal transmitter in the signal transmission system of the present invention.

FIG. 3 illustrates an example of the second multiplexing method. In this example, a circuit block 406 (e.g., MPU) for providing data to inputs of the signal generation circuits IF-SG-A to D of the plurality of interfaces outputs signals RA, RB, RC, and RD which mean starting the transmission. The transfer programmer TP explicitly receives the signals RA, RB, RC, and RD (402, 403, 404, and 405), thereby selecting interfaces to be stored into the serial bit array SBAT.

Incidentally, the methods illustrated in FIG. 1 and FIG. 3 are also usable in a manner of being combined with each other. Namely, if the circuit block, i.e., the transmission source of the data, can issue an explicit notification on the use of the interfaces, the method in FIG. 3 is usable. Meanwhile, if the circuit block cannot issue the explicit notification, the method in FIG. 3 is usable.

Next, referring to FIG. 4(a) to FIG. 4(c), the explanation will be given below regarding how the signals of the selected interfaces will be arranged into the serial bit array SBAT of the signal transmitter 100. As the case where some interfaces are selected from among a plurality of interfaces, FIG. 4(a) to FIG. 4(c) all illustrate an arrangement of a case where the interfaces IF-A, IF-C, and IF-D are selected, and where the signals A1 to A3, C1 to C2, and D1 to D2, which correspond to the interfaces IF-A, IF-C, and IF-D, respectively, are inputted into the serial bit array SBAT.

Figure 4A:
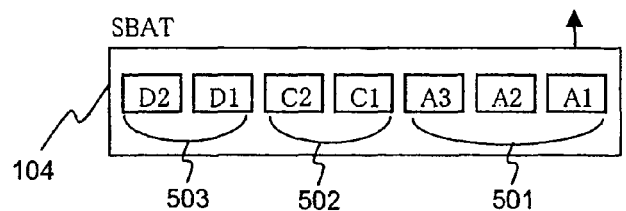
FIG. 4 is a diagram for illustrating the frame configuration to be serially transmitted.

In the case in FIG. 4(a), starting from the front-end of the serial bit array SBAT, the bit data (501, 502, and 503) of the interfaces IF-A, IF-C, and IF-D are stored in sequence. The signal receiver 200, however, does not know that the signal transmitter 100 has performed the data arrangement like this. Accordingly, the signal receiver 200 finds it impossible to perform the reconstruction of the data. Consequently, there occurs a necessity for a mechanism for transmitting the information on the data arrangement in the serial bit array SBAT from the signal transmitter 100 to the signal receiver 200.

Figure 4B:
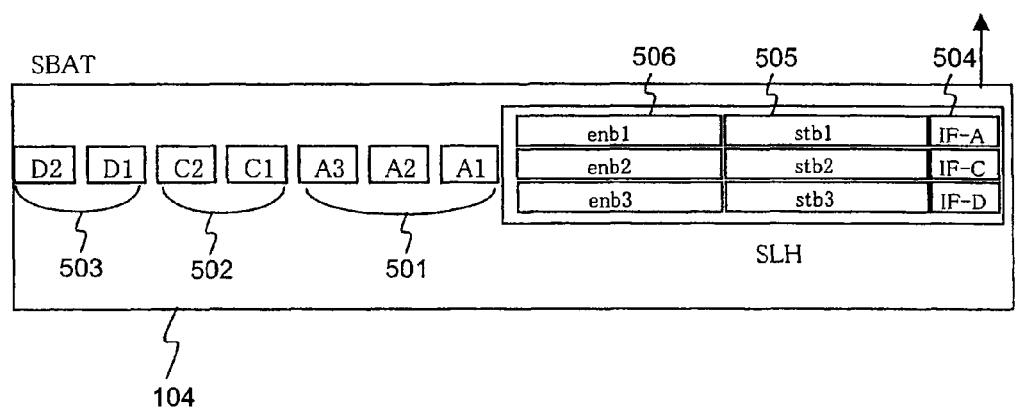

FIG. 4(b) illustrates an example of the first bit-data arrangement for transmitting the data arrangement information. In addition to the bit data (501, 502, and 503) of the respective interfaces IF-A, IF-C, and IF-D, header information SLH on the subsequent bit arrangement is arranged at the bit position preceding to the bit data (501, 502, and 503). The header information SLH indicates in which bit of the subsequent bits which interface's data is arranged. This example indicates that the signals A1 to A3 of the interface IF-A are arranged in a first area 504 (i.e., the interface IF-A is selected). More specifically, this example indicates that the arrangement position of the bit data 501 of the interface IF-A starts from a bit position stb1 stored in a second area 505 indicating the start bit position until a bit position enb1 stored in a third area 506 indicating the end bit position. The circumstances are also similar to the interfaces IF-C and IF-D. For example, the first area 504 is configured with two bits, and the second and third areas 505 and 506 are configured with six bits respectively. Incidentally, the exchange of the data arrangement information like this between the signal transmitter 100 and the signal receiver 200 is performed with a timing in which the interface selection situation is changed. Accordingly, in the example in FIG. 4(b), with a timing in which the selected interfaces become IF-A, IF-C, and IF-D, the header information SLH indicating the state is transmitted to the signal receiver 200. After that, until there occurs a change in the selected interfaces, the transmission is continued in a manner of not including the header information SLH. This is desirable for enhancing the communications efficiency.

Figure 4C:
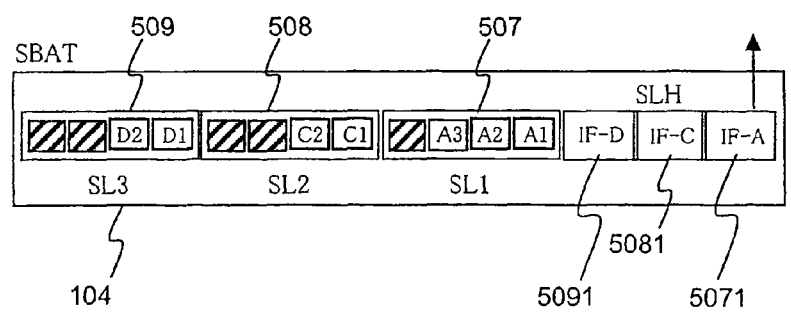

FIG. 4(c) illustrates an example of the second bit-data arrangement for transmitting the data arrangement information. In this example, the bit string in the serial bit array SBAT is divided in advance into slots having a constant bit size. Information (5071, 5081, and 5091) indicating by which interface each slot is used are stored into the header information SLH. In this example, the interface (the interface IF-A) using a first slot SL1 is specified into the first area 5071, the interface (the interface IF-C) using a second slot SL2 is specified into the second area 5081, and the interface (the interface IF-D) using a third slot SL3 is specified into the third area 5091. The method like this makes it unnecessary to indicate the start bit position and the end bit position of each interface. This makes it possible to reduce data amount of the data arrangement information preceding to the essential main bit data. For example, in the second example, each of the first to third areas of the header information SLH is configured with two bits. This makes it possible to reduce the data amount needed for the header information SLH as compared with in the first example. Also, since the bit size of each slot is determined in advance, it becomes possible to simplify a bit-position detection mechanism for detecting a bit position which becomes a separation between different interfaces in the signal receiver 200.

Figure 5:
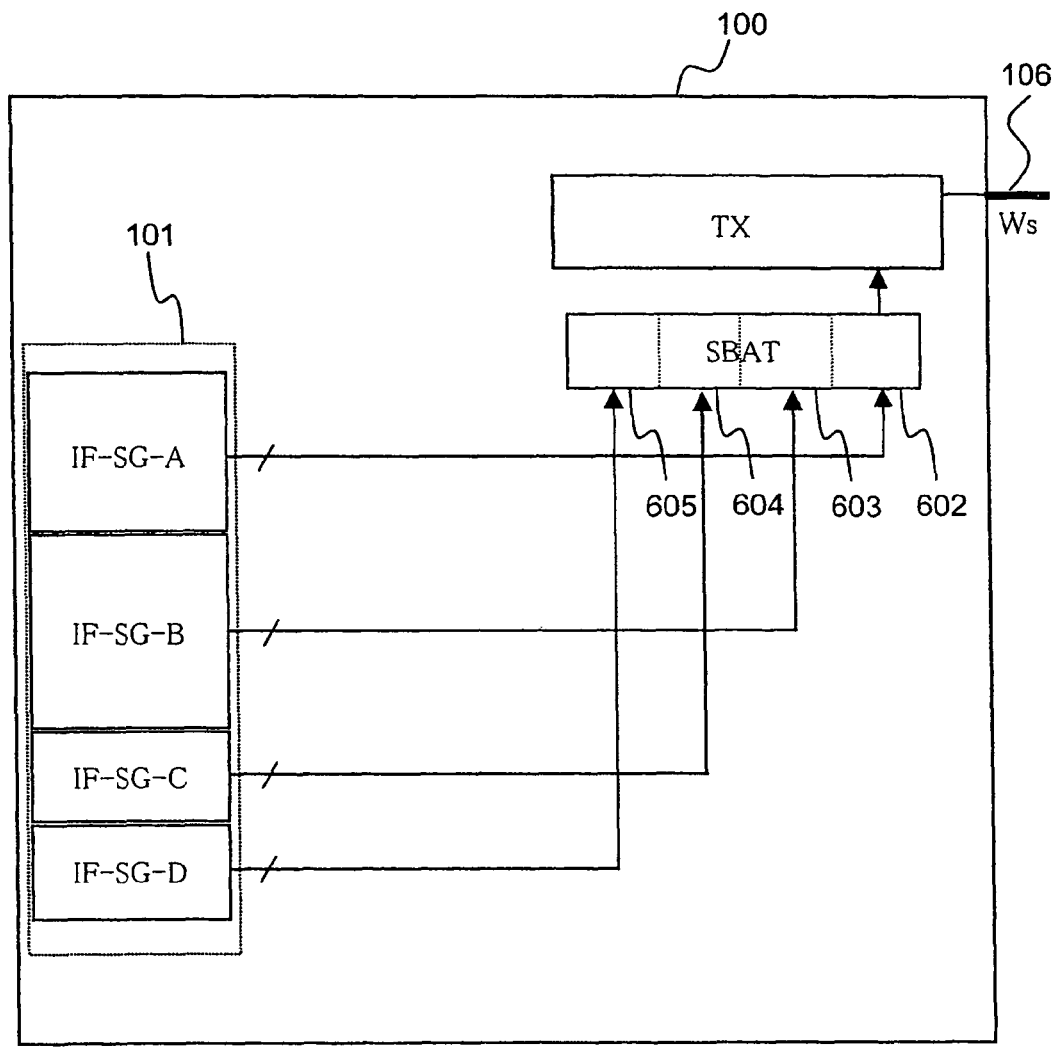
FIG. 5 is a diagram for illustrating still another configuration of the signal transmitter in the signal transmission system of the present invention.

FIG. 5 illustrates still another method for selecting some interfaces from among the plurality of interfaces, and multiplexing the selected interfaces in the signal transmitter 100. Namely, FIG. 5 illustrates a configuration where the interface-signal generation circuits IF-SG-A to D and the serial bit array SBAT are directly connected to each other without the intervention of the interface-signal selector IFS controlled by the transfer programmer TP. In this configuration, in order to arrange the bit data of all the interfaces into the serial bit array SBAT with none of the bit data left behind, it becomes necessary for the serial bit array SBAT to have an arrangement area which is equivalent to bit widths of the respective interfaces. Namely, the bit size of the serial bit array SBAT becomes necessary by the amount of the bit widths of all the interfaces.

As described earlier, every time the signal send-out circuit TX connected to the front-end bit data of the serial bit array SBAT transmits the 1-bit data, the serial bit array SBAT performs the 1-bit shift operation. On account of this, in a case where frequencies of the respective interfaces are different, if the interface-signal generation circuits IF-SG-A to D store the bit data into respective areas 602 to 605 of the serial bit array SBAT at their respective frequencies, there is a possibility that the 1-bit shift operation may crash the bit data. On account of this, in order that the bit data of every interface will be transmitted from the signal send-out circuit TX with none of the bit data left behind, it is required that the bit data in the serial bit array SBAT can be interchanged at a time on a constant period basis.

Next, referring to FIG. 6(a) and FIG. 6(b), the explanation will be given below concerning a method whereby the transfer programmer TP selects some interfaces from among the plurality of interfaces, and transfers the bit data of the selected interfaces into the serial bit array SBAT. Here, the explanation will be given regarding a control method whereby, when performing the transmission based on the slot configuration as illustrated in FIG. 4(c), the transfer programmer TP allocates the interfaces into the slots of the serial bit array SBAT.

The transfer programmer TP includes an interface information table 701 and a slot aligner SL-AL. The interface information table 701 describes therein the frequency F and bit width BW of each of the plurality of interfaces. Taking advantage of this table 701, the slot aligner SL-AL generates a control signal indicating into which slot within the serial bit array SBAT which interface's signals should be arranged. Hereinafter, when some interfaces are selected from among the plurality of interfaces in accordance with the processing steps explained using FIG. 1 or FIG. 3, it is assumed that the interfaces IF-A, IF-C, and IF-D will be selected. In other words, it is assumed that the interfaces which actually necessitate the data transmission are IF-A, IF-C, and IF-D.

Here, the following assumptions are made: Namely, the serial transmission operates at a frequency of 1920 MHz, and has a data transfer band by the amount of 1920 Mbps (: bit per second). Also, the area of the serial bit array SBAT into which the bit data of each interface will be stored is equal to 32 bit in width. The bit data stored therein is interchanged on a 60-MHz frequency basis. Moreover, the 32-bit width area is divided into slots of 8-bit width. Accordingly, the transmission band per slot is determined as being 60 MHz×8 bits=480 Mbps. The transfer programmer TP makes a comparison in advance between the transmission band which each interface uses and this per-slot transmission band, thereby determining into which slot of which cycle the signals of each interface should be arranged. Now, assuming that, as illustrated in FIG. 6 (a), the interfaces IF-A to D use data transfer bands of 30 MHz×32 bits (960 Mbps), 10 MHz×32 bits (320 Mbps), 15 MHz×56 bits (840 Mbps), and 2 MHZ×8 bits (16 Mbps), respectively, a 2136-Mbps band becomes necessary as a result of adding all these data transfer bands.

Figure 6A:
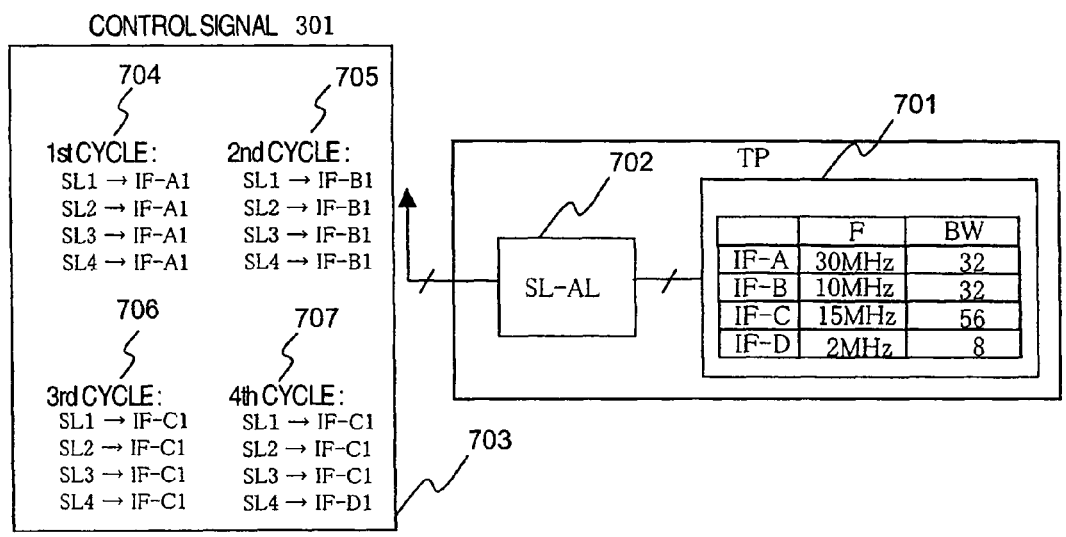
FIG. 6(a) and FIG. 6(b) are diagrams for illustrating the configuration of a transfer programmer.

The slot aligner SL-AL in FIG. 6(a) is an example where, regardless of in which interfaces the data transmission is actually necessitated, the transfer programmer TP issues the control signal 301 to the interface-signal selector IFS so that the selector IFS will select all the interfaces IF-A, IF-B, F-C, and IF-D. Namely, for example, the transfer programmer TP generates a control signal 703 instructing the selector IFS to sequentially select all of the four types of interfaces (IF-A to D) registered in the interface information table 701. The 32-bit data (which are equivalent to four slots, and denoted by SL1 to 4 respectively) of the serial bit array SBAT are interchanged on each cycle basis at the 60-MHz frequency. The bit data of each slot are arranged sequentially from a first cycle in correspondence with the bit width of each interface. In this case, at the first cycle, the transfer programmer TP outputs a control signal 704 fetching the bit data of the interface IF-A so that the signals of the interface IF-A will be arranged into the serial bit array SBAT. Since the interface IF-A is 32 bits in width, the signals of the interface IF-A can be arranged by occupying the four slots of the serial bit array SBAT in one cycle (first cycle). Next, the transfer programmer TP outputs a control signal 705 fetching the bit data of the interface IF-B so that the signals of the interface IF-B will be arranged. Since the interface IF-B is also 32 bits in width, the signals of the interface IF-B can be arranged by occupying the four slots of the serial bit array SBAT in one cycle (second cycle). Next, the transfer programmer TP outputs a control signal 706 fetching the bit data of the interface IF-C so that the signals of the interface IF-C will be arranged. Since the interface IF-C is 56 bits in width, the signals of the interface IF-C cannot be arranged by only occupying the four slots of the serial bit array SBAT in one cycle (third cycle). Accordingly, at a fourth cycle, the transfer programmer TP outputs a control signal 707 so that the remaining three slots will be used in order to arrange the bit data which remain unarranged. Moreover, in the control signal 707, the idle one slot is used in order to arrange the signals of the interface IF-D therein. Since the interface IF-D is 8 bits in width, it turns out that the bit number equivalent to the summation of the bit widths of all the interfaces is obtained with the four cycles.

In the above-described method, the bit data from all the interfaces registered in the interface information table 701 are transferred to the serial bit array SBAT simply in this way. This method, however, is likely to result in a shortage of the data transfer band although it is easily implementable. Here, attention is focused on the interface IF-A. The interface IF-A is needed to transfer the 32-bit data at the 30-MHz frequency. In contrast thereto, the data to be stored into the serial bit array SBAT is the 32-bit data at one time in four cycles at the 60-MHz cycle. Accordingly, eventually, the 32-bit data will be arranged at only a 15-MHz cycle. This situation cannot satisfy the requirement of the data transfer band of the interface IF-A which must transfer the 32-bit data at the 30-MHz cycle. Consequently, this transfer method causes a state to occur where the necessary data transfer cannot be performed in the interface IF-A.

The bit data, however, are not always transferred from all the interfaces as described above. Namely, when considering a certain length of time-zone, the interfaces which actually necessitate the data transfer are some of them. FIG. 6(b) illustrates another method whereby, when the interfaces which actually necessitate the data transmission are IF-A, IF-C, and IF-D, the transfer programmer TP arranges the bit data into the serial bit array SBAT. Similarly to FIG. 6(a), the 32-bit data (equivalent to the four slots) of the serial bit array SBAT are interchanged on each cycle basis at the 60-MHz frequency. At a first cycle, the transfer programmer TP outputs a control signal 709 fetching the bit data of the interface IF-A so that the signals of the interface IF-A will be arranged into the serial bit array SBAT. Next, the transfer programmer TP detects that the signals of the interface IF-B need not be transferred, thus making no arrangement on the interface IF-B into the serial bit array SBAT. Instead, at a second cycle, the transfer programmer TP outputs a control signal 710 fetching the bit data of the interface IF-C so that the signals of the interface IF-C will be arranged. Since the interface IF-C is 56 bits in width, all the bit data of the interface IF-C have been not yet arranged into the serial bit array SBAT after the four slots of the serial bit array SBAT have been occupied. At a third cycle, however, the transfer programmer TP outputs a control signal 711 fetching the bit data of the interface IF-A so that the signals of the interface IF-A will be arranged into the serial bit array SBAT. Next, at a fourth cycle, the transfer programmer TP outputs a control signal 712 so that the 24-bit (i.e., 56 bits (i.e., the bit width of the interface IF-C)—32 bits (i.e., the bit number arranged into the serial bit array SBAT at the second cycle)) data of the interface IF-C, which have been not yet arranged into the serial bit array SBAT, will be arranged into the remaining three slots. Moreover, in the control signal 712, the idle one slot is used in order to arrange the signals of the interface IF-D therein. Hereinafter, these four cycles will be repeated.

Figure 6B:
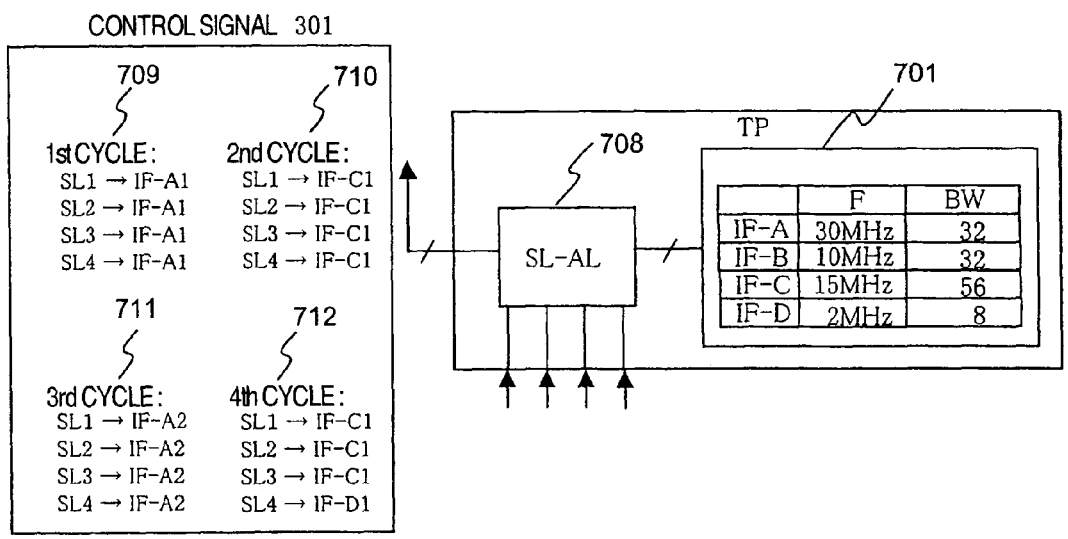

Now, when the data transfer as is illustrated in FIG. 6(b) has been performed, in the interface IF-A, the 32-bit data are transferred into the serial bit array SBAT by using the four slots at the first and third cycles, respectively. Namely, the 32-bit data at one time in two cycles are arranged into the serial bit array SBAT. Accordingly, it becomes possible to arrange the 32-bit data into the serial bit array SBAT at a cycle of 30 MHz, i.e., one-half of 60 MHz, and to transfer the 32-bit data via the signal send-out circuit TX. This is identical to the 30-MHz×32-bit data transfer band which the interface IF-A necessitates. Next, focusing attention on the interface IF-C, the data by the amount of seven slots in total are arranged into the serial bit array SBAT by using the four slots and three slots at the second and fourth cycles, respectively. Consequently, 56-bit data can be transferred in four cycles. This situation turns out to have a 56-bit transfer band at a cycle of 15 MHz, i.e., one-quarter of 60 MHz. This is identical to the transfer band which the interface IF-C necessitates. Moreover, in the interface IF-D, the data arrangement is made by using the idle one slot at the fourth cycle. Namely, the 8-bit data transfer is possible at a cycle of 15 MHz, i.e., one-quarter of 60 MHz. This is equivalent to 15 MHz×8 bits=120 Mbps. Meanwhile, the transfer band which the interface IF-D necessitates is 2 MHz×8 bits=16 Mbps. Since this value is smaller than 120 Mbps, no problem will occur concerning the transfer band. In this way, by making the multiplexing method differ depending on the interfaces selected, it becomes possible to lower a possibility that the shortage of the transfer band will occur.

Figure 7A:
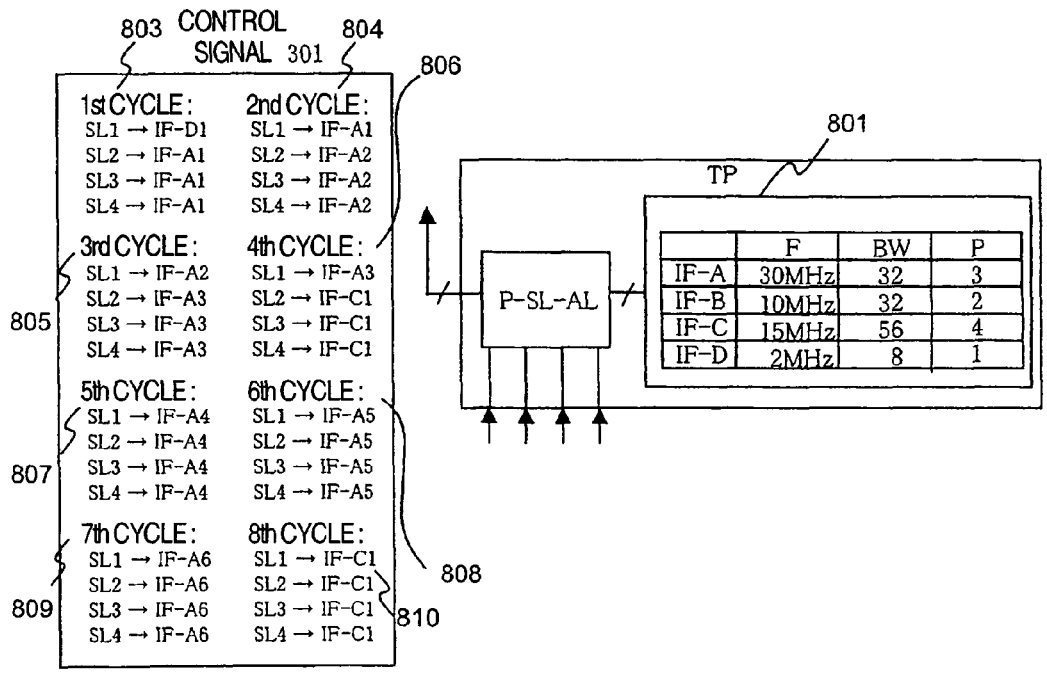
FIG. 7(a) is a diagram for illustrating the configuration of the transfer programmer which assigns priorities among interfaces.

FIG. 7(a) illustrates another example of the control method whereby the transfer programmer TP allocates the interfaces into the slots of the serial bit array SBAT. This example is about a case where the programmer TP allocates the interfaces by taking into consideration request satisfaction degrees for the transfer bands among the interfaces. The control method like this is preferable for a case where the request satisfaction degrees differ depending on the interfaces, and where, in an interface whose request satisfaction degree is low, the problem as the system is small even when the transfer band is not satisfied. In this example, the transfer programmer TP arranges the bit data from each interface into the serial bit array SBAT by taking into consideration the severities of the transfer-band requests like this.

In this example, the following assumptions are made: Namely, the serial transmission operates at a 1280-MHz frequency, and has a 1280-Mbps data transfer band. Also, the bit data stored in the 32-bit width serial bit array SBAT is interchanged on a 40-MHz frequency basis. In the example in FIG. 7(a), in an interface information table 801, priorities P are assigned to the respective interfaces as indicators for indicating the request satisfaction degrees. The priorities P are assigned thereto in an order of the interfaces IF-D, IF-B, IF-A, and IF-C. Accordingly, when the interfaces IF-A, IF-C, and IF-D are selected, the higher the priority P of an interface is, the bit data of the interface is arranged into a higher-speed cycle.

A priority-assigned slot aligner P-SL-AL, at a first cycle, outputs a control signal 803 fetching the bit data of the interface IF-D with the highest priority so that the signals of the interface IF-D will be arranged into the serial bit array SBAT. Since the bit data of the interface IF-D is 8 bits in width, the bit data of the interface IF-D is arranged into one slot of the serial bit array SBAT at the first cycle. Also, the transfer programmer TP detects that the signals of the interface IF-B with the second priority need not be transferred. Accordingly, the programmer TP causes the control signal 803 to fetch the bit data of the interface IF-A with the third priority into the remaining three slots of the serial bit array SBAT at the first cycle so that the signals of the interface IF-A will be arranged. On account of this, first, the 24-bit data out of the 32-bit data of the interface IF-A are arranged into the remaining three slots of the serial bit array SBAT at the first cycle. Next, the priority-assigned slot aligner P-SL-AL outputs a control signal 804 so that the remaining 8-bit data of the interface IF-A will be arranged at a second cycle. Also, the control signal 804 arranges the next 24-bit data of the interface IF-A into the remaining three slots at the second cycle. Subsequently, at a third cycle, the slot aligner P-SL-AL outputs a control signal 805 fetching the bit data of the interface IF-A so that the remaining 8-bit data of the interface IF-A will be arranged.

The control signal 805 arranges the next 24-bit data of the interface IF-A into the remaining three slots at the third cycle. At a fourth cycle, the slot aligner P-SL-AL outputs a control signal 806 fetching the bit data of the interface IF-A so that the remaining 8-bit data of the interface IF-A will be arranged. The control signal 806 arranges 24-bit data out of 56-bit data of the interface IF-C into the remaining three slots at the fourth cycle. Incidentally, since the interface IF-C is of the 56-bit data, the remaining 32-bit data have been not yet arranged. At a fifth cycle, the slot aligner P-SL-AL outputs a control signal 807 fetching the bit data of the interface IF-A so that the next data of the interface IF-A will be arranged into the serial bit array SBAT. At a sixth cycle, the slot aligner P-SL-AL outputs a control signal 808 fetching the bit data of the interface IF-A so that the next data of the interface IF-A will be further arranged. At a seventh cycle, the slot aligner P-SL-AL outputs a control signal 809 fetching the bit data of the interface IF-A so that the next data of the interface IF-A will be arranged into the serial bit array SBAT. At an eighth cycle, the slot aligner P-SL-AL outputs a control signal 810 fetching the bit data of the interface IF-A so that the next data of the interface IF-A will be arranged into the serial bit array SBAT. Hereinafter, the above-described eight cycles will be repeated.

It is confirmed whether or not, when the data transfer as described above is performed, the data transfer can be performed while satisfying the transfer band which each interface necessitates. First, regarding the interface IF-D, the bit data by the amount of the one slot is arranged at the first cycle, and no further data arrangement has been made until the eighth cycle. Accordingly, the 8-bit data is transferred at one time in a 5-MHz (40-MHz/8) frequency. Namely, this is identical to a 5-MHz×8-bit data transfer band, and is smaller than the data transfer band which the interface IF-D necessitates. Consequently, no problem will occur whatsoever (the surplus part of the data transfer band may be left with no data arranged therein). Next, focusing attention on the interface IF-A, the twelve slots are arranged in the first to fourth cycles and the fifth to eighth cycles, respectively. Accordingly, 32×3-bit data transfer is performed per 10 MHz (40 MHz/4). This is identical to the 30-MHz×32-bit transfer band which the interface IF-A necessitates. Consequently, no problem will occur whatsoever. Next, focusing attention on the interface IF-C, the data by the amount of seven slots in total are arranged by using the three slots and four slots at the fourth and eighth cycles, respectively. Accordingly, the 56-bit data can be transferred in eight cycles. Namely, this situation turns out to have a 56-bit transfer band at a 5-MHz (40-MHz/8) frequency. This is smaller than the 15-MHz×56-bit transfer band which the interface IF-C necessitates, and thus the transfer band of the interface IF-C cannot be satisfied. However, in the case where it is tolerable and negligible that the request satisfaction degree of the interface IF-C is lower than those of the other interfaces (i.e., IF-A and IF-D here), the shortage of the transfer band in the interface IF-C like this can be said to be more desirable than shortages of the transfer bands in the other interfaces.

Figure 7B:
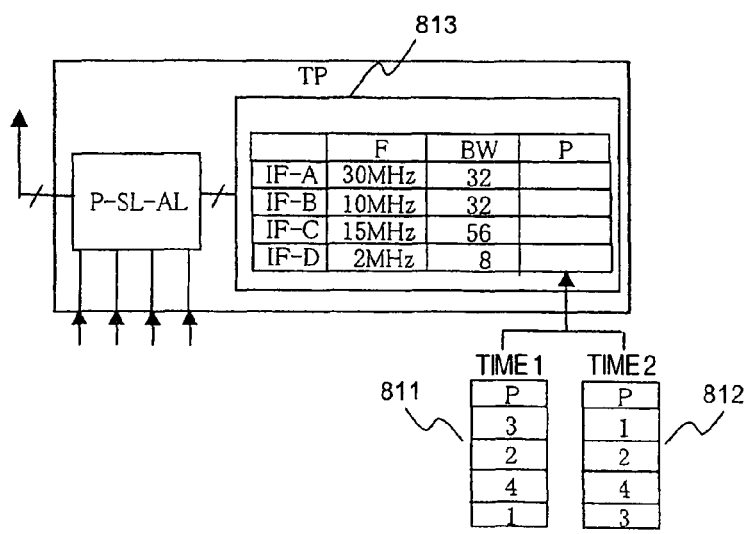
FIG. 7(b) is a diagram for illustrating the configuration of the transfer programmer when the priorities are made changeable.

FIG. 7(b) illustrates an example where priorities P in an interface information table 813 are not set as fixed values, but are implemented as writings into a changeable register or memory. The employment of this configuration makes it possible to flexibly change the priorities (811 or 812) after the system design or system start-up without fixedly determining the priorities among the interfaces at the time of the system manufacturing.

Figure 8A:
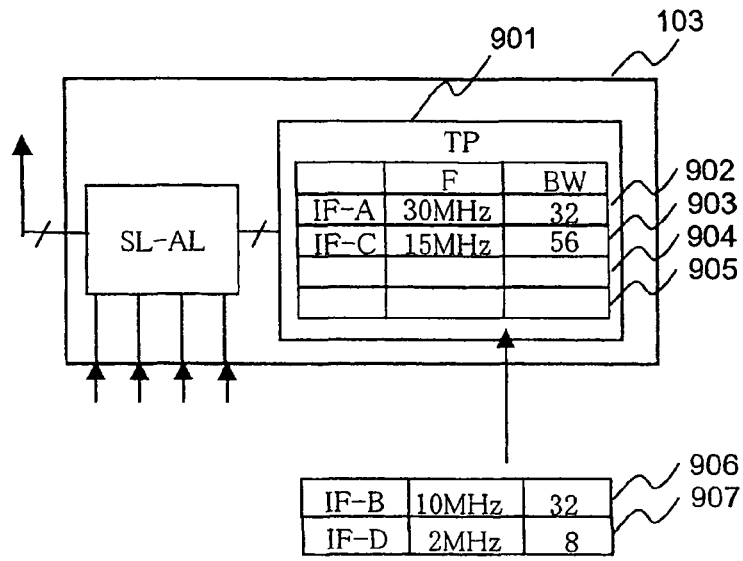
FIG. 8(a) and FIG. 8(b) are diagrams for illustrating the configuration of the transfer programmer when interface information is made changeable.
Figure 8B:
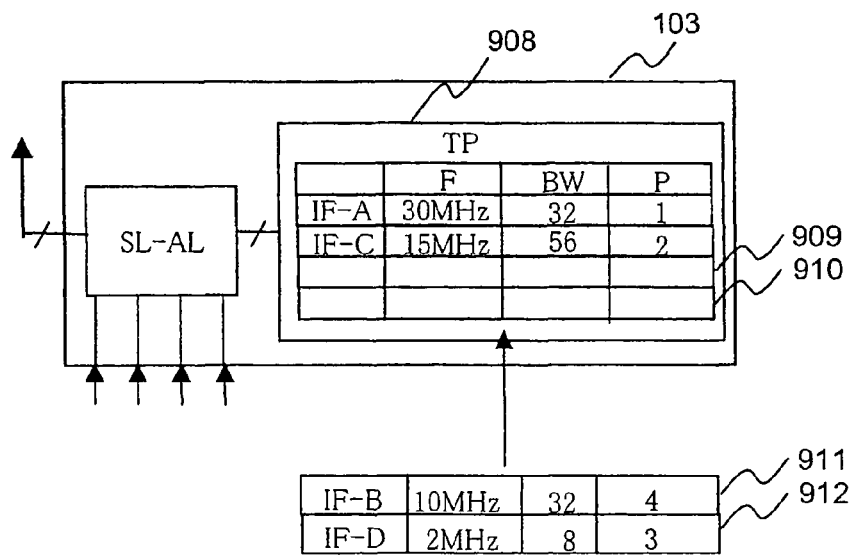

FIG. 8(a) illustrates a configuration where the information on each interface is made changeable in the interface information table after the system manufacturing as well. Namely, in an interface information table 901, in addition to interface information (902, 903) registered in advance, the other interface information (906, 907) can be registered after the system manufacturing into areas (904, 905) which differ from areas where the information (902, 903) are registered. The registration of all the interface information may be performed after the system manufacturing. FIG. 8(b) illustrates an example where the interface information is additionally registered into the priority-assigned interface information table after the system manufacturing or system operation.

Figure 9:
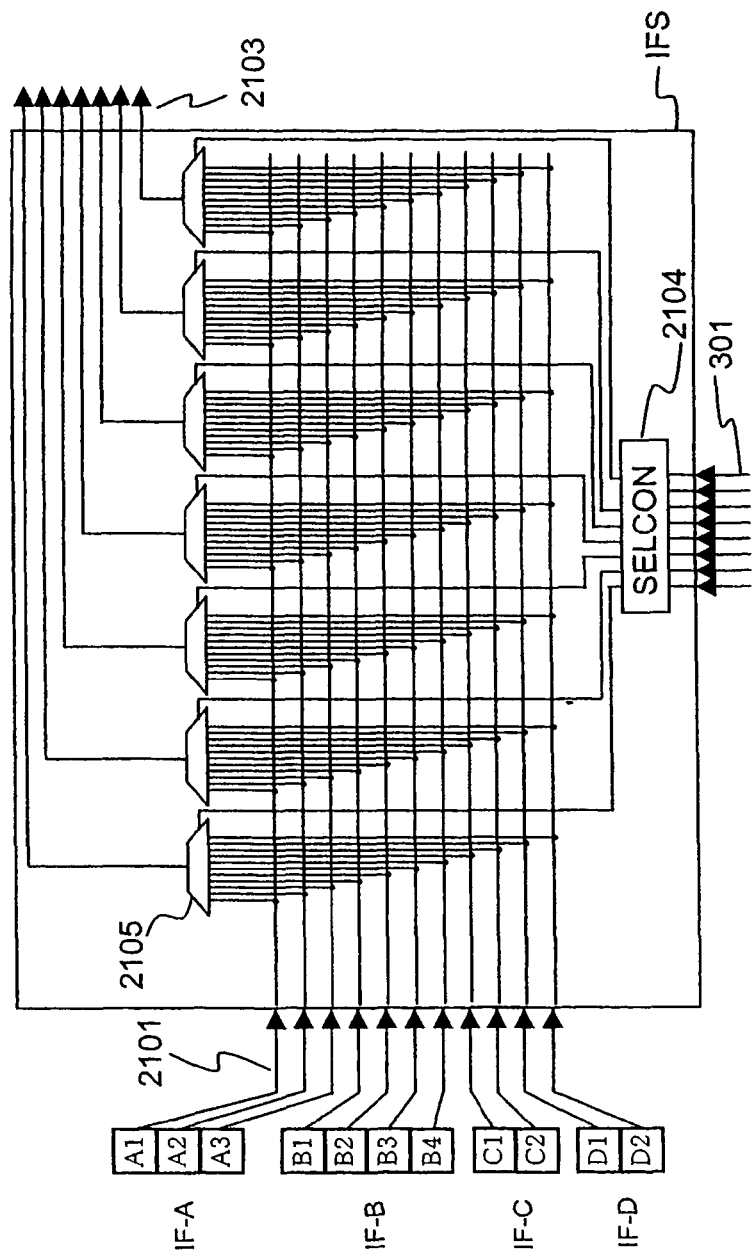
FIG. 9 is a diagram for illustrating a first configuration example of an interface-signal selector.
Figure 10:
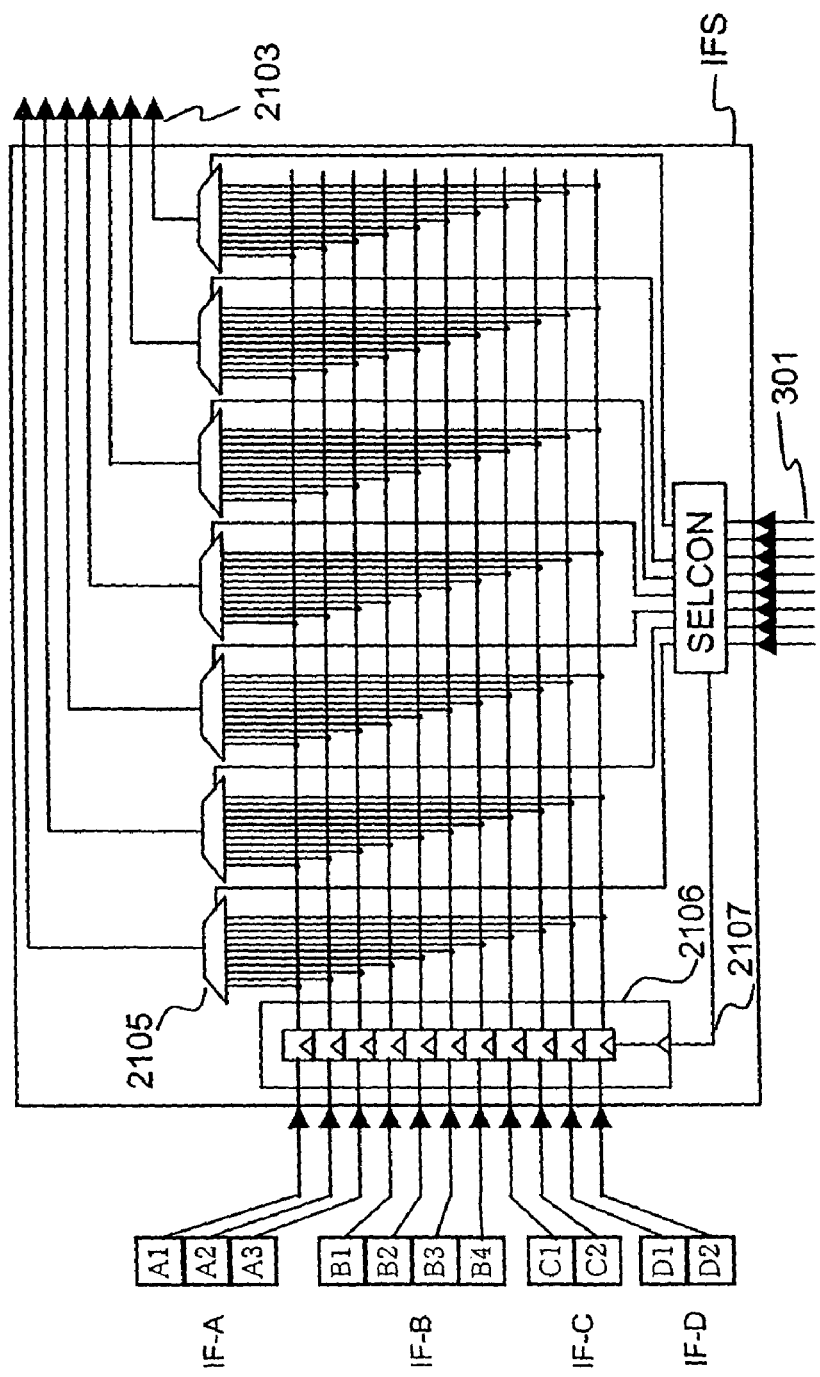
FIG. 10 is a diagram for illustrating a second configuration example of the interface-signal selector.
Figure 11:
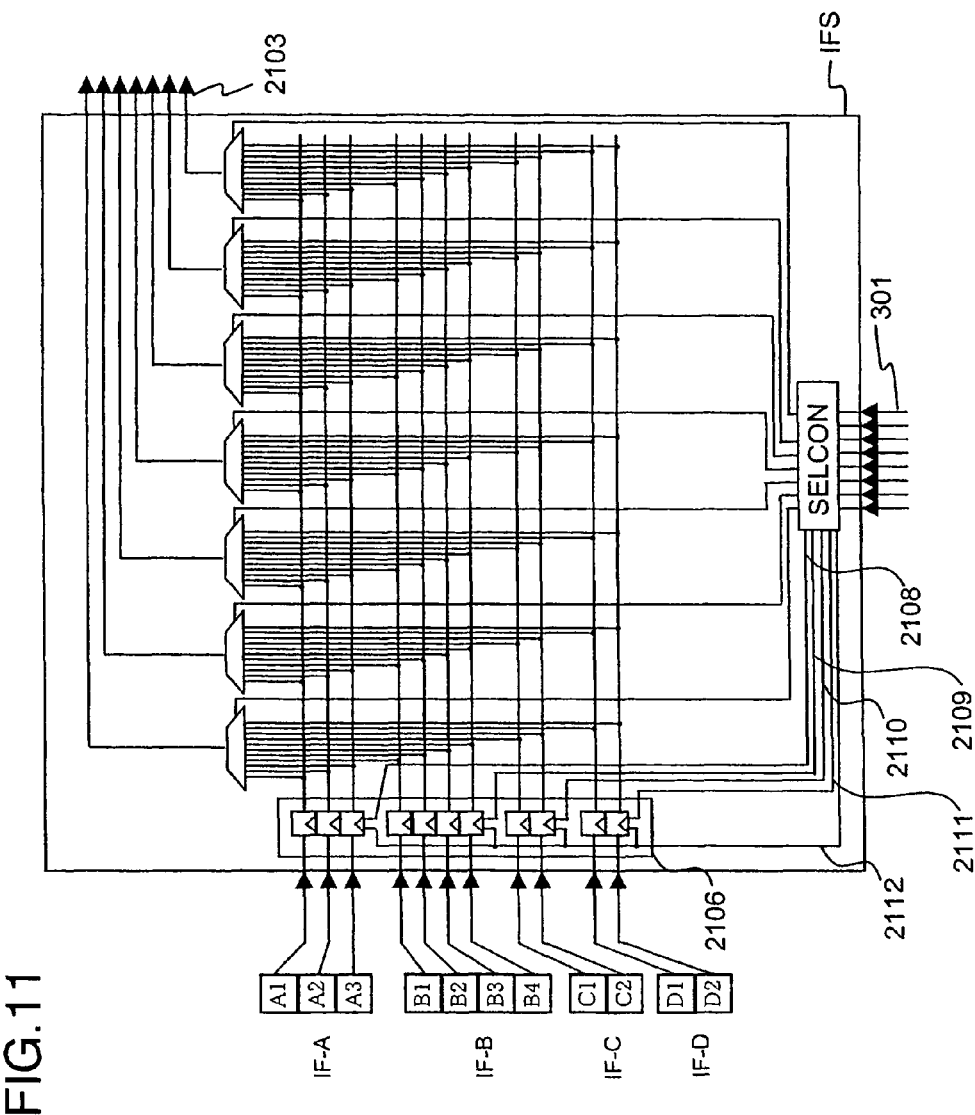
FIG. 11 is a diagram for illustrating a third configuration example of the interface-signal selector.

Next, referring to FIG. 9 to FIG. 11, the explanation will be given below concerning configuration examples of the interface-signal selector IFS. The interface-signal selector IFS has the function of extracting signals of some interfaces generated by the signal generation circuits and selected from among the plurality of interfaces, and outputting the selectively extracted signals to the serial bit array SBAT. The selection of the interfaces is made based on the control signals 301 received from the transfer programmer TP. The interface-signal selector IFS receives the signals 2101 of the plurality of interfaces and, based on the control signals 301, selects the interfaces to be outputted to the serial bit array SBAT. The respective signals 2101 from the plurality of interfaces are inputted into selectors 2105 which are connected to outputs 2103 to the serial bit array SBAT. The signals from the interfaces to be selected by the control signals 301 from the transfer programmer TP are selected by the selectors 2105 which are controlled by a selector controller SELCON. Then, the signals selected are arranged into the serial bit array SBAT. FIG. 10 is a diagram for illustrating another configuration example. When the frequencies of the plurality of interfaces are equal to each other, the signals from each interface are stored into a memory 2106 so as to be temporarily saved in a manner of being synchronized with a reference signal 2107. After that, the synchronized signals are outputted to the selectors 2105. On account of this, even if differences in the input timings exist among the signals from the plurality of interfaces, it becomes possible to prevent influences of the differences in the input timings from being exerted on signal propagation paths after the selectors 2105. Namely, this prevention is implemented by storing the signals into the memory 2106 in the manner of being temporarily synchronized with the reference signal 2107, and outputting the signals with the same timing by synchronizing the signals with the reference signal 2107 again. The memory 2106 like this can be implemented using a circuit for saving and outputting values in synchronization with clock signals of a D flip-flop or the like. FIG. 11 is a diagram for illustrating still another configuration example. When the frequencies of the plurality of interfaces are different from each other, when saving the signals from each interface temporarily, the signals are stored into the memory in a manner of being synchronized with different reference signals (2108, 2109, 2110, and 2111). After that, the signals are outputted in a manner of being synchronized with another reference signal 2112 again.

Figure 12A:
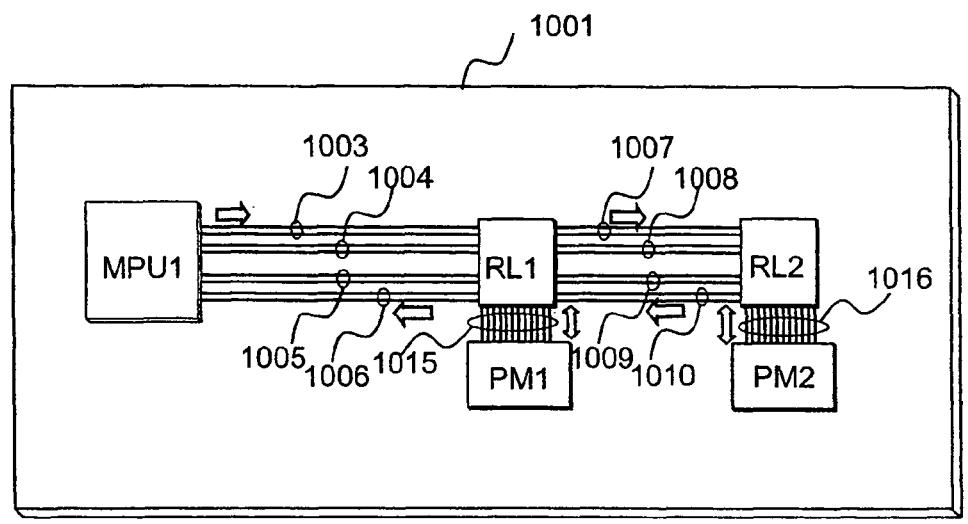
FIG. 12(a) and FIG. 12(b) are diagrams for illustrating a configuration example of the signal transmission system of the present invention.

FIG. 12(a) illustrates a configuration example of the signal transmission system of the present invention. This configuration includes a microprocessor MPU1 and two peripheral modules (PM1, PM2) on a printed board 1001. Each of the peripheral modules refers to, e.g., a device controlled by the microprocessor, such as camera module, liquid-crystal display module, or memory module, and a configuration component other than the microprocessor, such as storage device for the microprocessor, or auxiliary processor for making specific calculations such as image processing and voice processing. Although, exactly speaking, the camera module and liquid-crystal display module include not only integrated circuits but also main bodies of the camera and liquid-crystal display, only the integrated-circuit portions on the printed board 1001 are illustrated in the diagram. It is assumed that the microprocessor MPU1 includes the transmission unit as illustrated in FIG. 1 for transmitting a plurality of selected interface parallel signals in such a manner that the parallel signals are multiplexed into a serial signal, and the reception unit as illustrated in FIG. 2 for receiving the multiplexed serial signal to reconstruct the multiplexed serial signal to the respective interface parallel signals. In an example in the diagram, transmissions of the data and clock signals are performed using differential serial-signal signal transmission paths each of which is manufactured by forming two signal lines into a pair.

The differential serial-signal signal transmission paths connected to the microprocessor MPU1 are the following four sets: A differential serial-signal signal transmission path 1003 for data transmitted from the microprocessor MPU1 to the peripheral module PM1, a differential serial-signal signal transmission path 1005 for data received by the microprocessor MPU1, a differential clock-signal signal transmission path 1004 for a clock signal synchronized with the data transmitted from the microprocessor MPU1, and a differential clock-signal signal transmission path 1006 for a clock signal synchronized with the data received by the microprocessor MPU1. In the diagram, for some help to understanding, directions of the signals are indicated by denoting arrows beside the transmission paths.

Figure 12B:
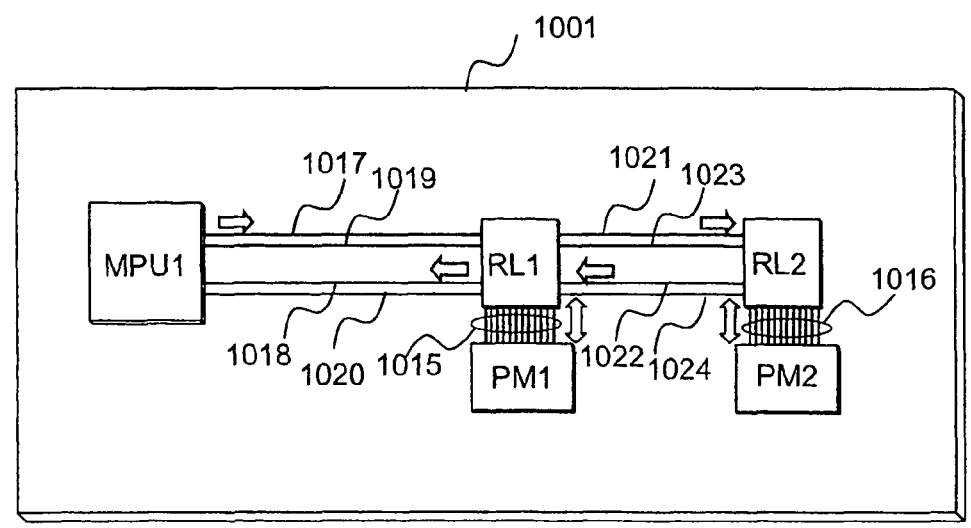

It is assumed that the peripheral modules PM1 and PM2 used in the system configuration in FIG. 12(*a*) include conventional parallel interfaces. This situation makes it necessary to set up relays RL1 and RL2 for transmitting/receiving parallel signals which match the conventional parallel interfaces of the respective peripheral modules PM1 and PM2. Regarding configuration of the relays RL1 and RL2, the detailed explanation will be given later using another diagram. Here, only the functions of the relays will be explained. The relay RL1 has a function of receiving the multiplexed serial signal transmitted from the microprocessor MPU1 via the differential serial-signal signal transmission path 1003, converting the multiplexed serial signal into parallel signals, selecting only the parallel signals necessary for the peripheral module PM1, and transmitting the selected parallel signals to the peripheral module PM1 via a parallel-signal transmission path 1015. Also, the relay RL1 has a function of receiving parallel signals transmitted from the peripheral module PM1 via the parallel-signal transmission path 1015, receiving a serial signal transmitted from the relay RL2 via a differential serial-signal signal transmission path 1009, generating a multiplexed serial signal from these signals received, and transmitting the multiplexed serial signal to the microprocessor MPU1 via the differential serial-signal signal transmission path 1005. Moreover, the relay RL1 has a function of receiving the multiplexed serial signal transmitted from the microprocessor MPU1 via the differential serial-signal signal transmission path 1003, and transmitting the multiplexed serial signal to the relay RL2 via a differential serial-signal signal transmission path 1007. Although the relay RL2 has basically the same functions as the relay RL1, the relay RL2 differs from the relay RL1 in a point of having no connection to another relay. The signal transmissions like this are signal transmissions where, like a case where the two peripheral modules PM1 and PM2 are a camera module and a liquid-crystal display module, the data transfer exists only between the microprocessor and the peripheral modules, and no data transfer exists between the peripheral modules. In contrast thereto, in some cases, the data transfer between the peripheral modules does exist. For example, in a case where the two peripheral modules PM1 and PM2 are a memory and an image processing processor, both of the image processing processor and the microprocessor access the memory. Also, transmission/reception of a signal might be able to exist between the image processing processor and the microprocessor. In this case, the relay RL1 performs the operation of converting the serial signal transmitted from the microprocessor MPU1 into parallel signals, selecting only the parallel signals necessary for the peripheral module PM1, and transmitting the selected parallel signals to the peripheral module PM1 via the parallel-signal transmission path 1015. Not only this operation, the relay RL1 also performs an operation of converting a serial signal transmitted from the relay RL2 into parallel signals, selecting only the parallel signals necessary for the peripheral module PM1, and transmitting the selected parallel signals to the peripheral module PM1 via the parallel-signal transmission path 1015. Also, the relay RL1 performs an operation of receiving parallel signals transmitted from the peripheral module PM1 via the parallel-signal transmission path 1015, and judging whether the parallel signals received should be transmitted to the microprocessor MPU1 or the peripheral module PM2. Subsequently, if the relay RL1 has judged that the parallel signals be transmitted to the microprocessor MPU1, the relay RL1 generates a multiplexed serial signal by synthesizing the parallel signals with a serial signal transmitted from the relay RL2, and transmits the multiplexed serial signal to the microprocessor MPU1 via the differential serial-signal signal transmission path 1005. Meanwhile, if the relay RL1 has judged that the parallel signals be transmitted to the peripheral module PM2, the relay RL1 generates a multiplexed serial signal by synthesizing the parallel signals with a serial signal transmitted from the microprocessor MPU1, and transmits the multiplexed serial signal to the relay RL2 via the differential serial-signal signal transmission path 1007. In this way, in the conventional parallel interfaces, all the parallel-signal transmission paths 1015 and 1016 in FIG. 12(*a*) cannot help being connected to the microprocessor MPU1. Considering this situation, it becomes easily understandable that the number of the signal transmission paths to be connected to the microprocessor can be reduced more largely than in the prior arts.

FIG. 12(*b*) illustrates an example where the so-called one-wire line differential transmission paths referred to as "single ends" are used in substitution for the differential transmission paths illustrated in FIG. 12(*a*). Although input/output circuits within the microprocessor and the relays differ between the one-wire line and the two-wire line, the different input/output circuits are omitted in the present diagram. This is because it is effective enough to use the publicly-known technologies such as TTL, SSTL, and HCMOS in the one-wire line, and LVDS and CML in the two-wire line. These input/output circuits are not limited in the present invention.

Also, in FIG. 12(*a*) and FIG. 12(*b*), the clock signals are transmitted from the transmission side in such a manner that the clock signals are synchronized with the serial data. In FIG. 12(*a*), the differential clock-signal signal transmission paths include the differential clock-signal signal transmission path 1004 for transmitting the clock signal synchronized with the serial data transmitted from the microprocessor MPU1, the differential clock-signal signal transmission path 1006 for transmitting the clock signal synchronized with the serial data transmitted from the relay RL1 to the microprocessor MPU1, a differential clock-signal signal transmission path 1008 for transmitting a clock signal synchronized with the serial data transmitted from the relay RL1 to the relay RL2, and a differential clock-signal signal transmission path 1010 for transmitting a clock signal synchronized with the serial data transmitted from the relay RL2 to the relay RL1. Similarly, in FIG. 12(*b*), the clock-signal signal transmission paths include a signal transmission path 1019 for transmitting a clock signal synchronized with the serial data transmitted from the microprocessor MPU1, a signal transmission path 1020 for transmitting a clock signal synchronized with the serial data transmitted from the relay RL1 to the microprocessor MPU1, a signal transmission path 1023 for transmitting a clock signal synchronized with the serial data transmitted from the relay RL1 to the relay RL2, and a signal transmission path 1024 for transmitting a clock signal synchronized with the serial data transmitted from the relay RL2 to the relay RL1. In the case of performing the high-speed serial data transfer, a timing shift between serial data and a clock signal corresponding thereto, which is referred to as "skew", must be suppressed down to the lowest possible degree. Accordingly, as illustrated in the diagrams, the method is used where the transmission side transmits the clock signals along with the serial data in such a manner that the clock-signal signal transmission paths and the serial-signal signal transmission paths are made as equal as possible in lengths and as parallel as possible in directions.

Figure 13A:
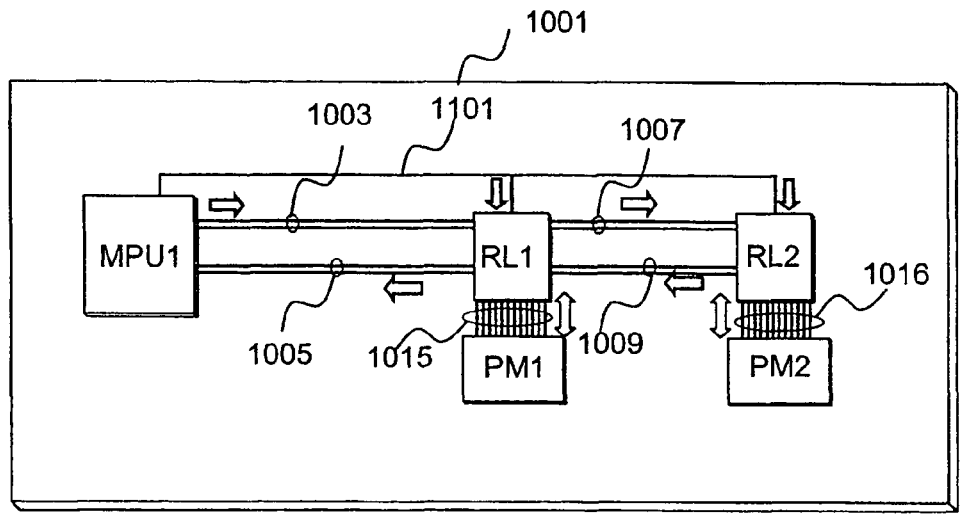
FIG. 13(a) and FIG. 13(b) are diagrams for illustrating another configuration example of the signal transmission system of the present invention.
Figure 13B:
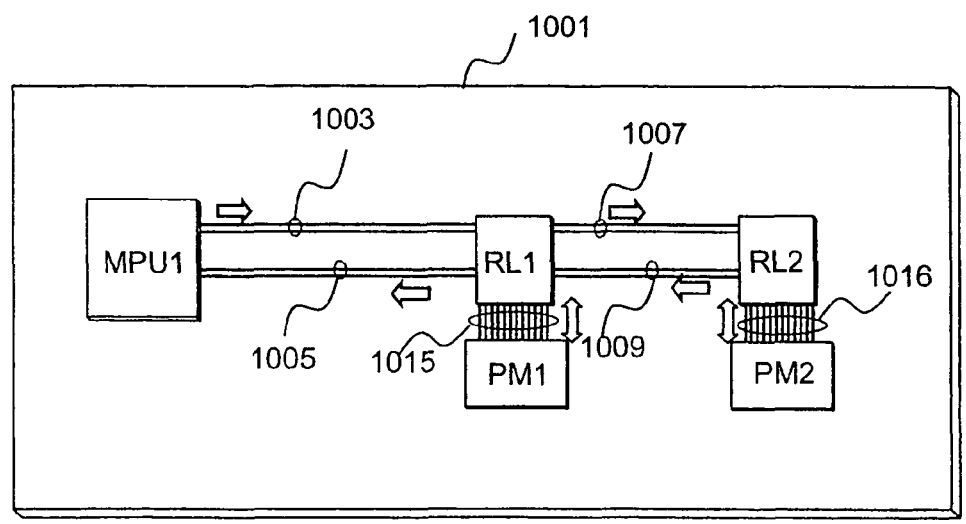

FIG. 13 illustrates another configuration example of the signal transmission system of the present invention. This configuration performs a clock supply which differs from the one in FIG. 12. The clock supply in FIG. 13(*a*) is suitable for a case where the transfer frequency of the serial data is comparatively low. In this configuration, the clock signals are distributed to all the modules from the microprocessor MPU1 via a clock-signal signal transmission path 1101. The present diagram illustrates an example where the transmissions are performed on the clock-signal signal transmission path not by the differential signals but by a single-line signal. Also, conversely, in the case of performing even higher-speed serial transmission than the high-speed serial transmission in FIG. 12(*a*) and FIG. 12 (*b*), even a microscopic skew between serial data and a clock signal presents the problem. Accordingly, the transmissions of the clock signals synchronized with the serial data are not performed. Instead, as illustrated in FIG. 13(*b*), it is effective enough to use the so-called clock-data recovery circuit where the transmission side transmits a clock signal in a manner of being embedded into serial data, and where the reception side reproduces the serial data and the clock signal from the reception signal. Since the publicly-known technologies exist as these technologies, the explanation thereof will be omitted here.

Figure 14:
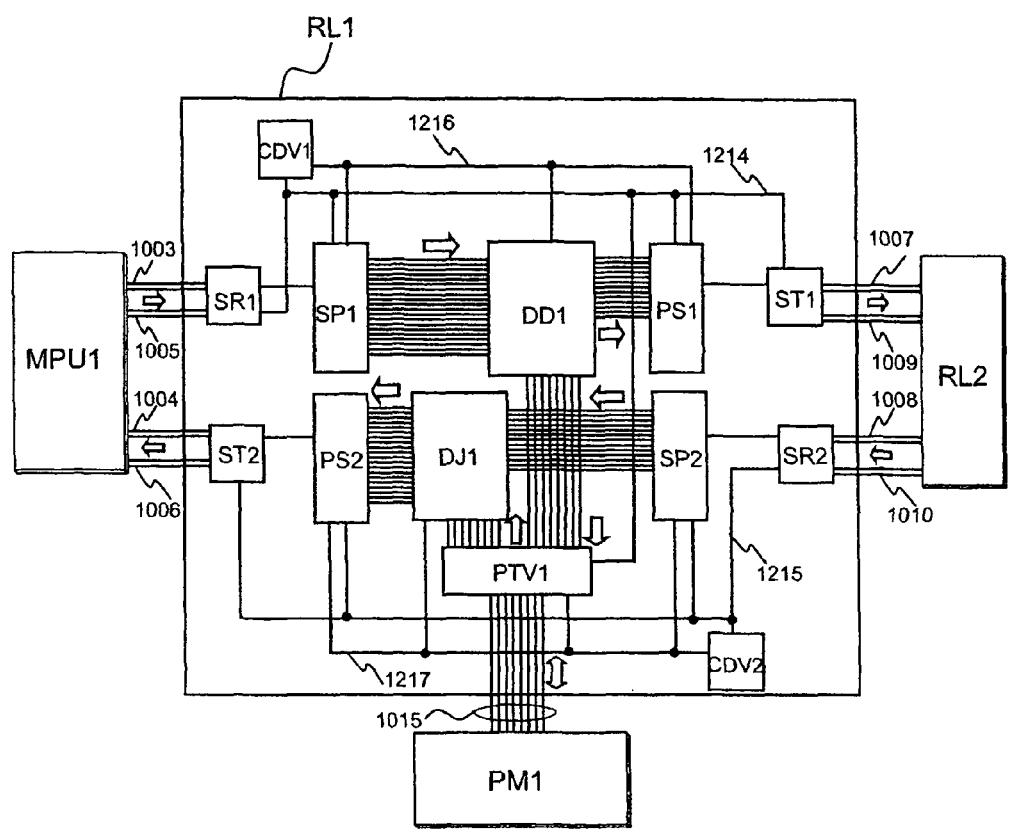
FIG. 14 is a diagram for illustrating a configuration example of a relay.

FIG. 14 is a diagram for illustrating the detailed internal configuration of the relay RL1 of the signal transmission system illustrated in FIG. 12(*a*). The data to be transmitted to the two peripheral modules PM1 and PM2 are multiplexed and serialized in the microprocessor MPU1, and the resultant serial data is transmitted to the differential signal transmission path 1003 from the microprocessor MPU1. Simultaneously, the clock signal synchronized with the serial data is transmitted to the differential signal transmission path 1005. The relay RL1 receives these differential signals at a serial receiver SR1. The serial data received is inputted into a serial/parallel converter SP1. The clock signal received is distributed into a clock frequency-divider CDV1, the serial/parallel converter SP1, a parallel/serial converter PS1, and a serial transmitter ST1 via a clock-signal line 1214 within the relay RL1. Hereinafter, this clock signal will be referred to as "first serial clock". The clock frequency-divider CDV1 frequency-divides the first serial clock into a clock whose frequency is lower than that of the first serial clock. Hereinafter, this clock will be referred to as "first parallel clock". The first parallel clock is distributed into the serial/parallel converter SP1, a data diverter DD1, the parallel/serial converter PS1, and a parallel transceiver PTV1 via a clock-signal line 1216 within the relay RL1. The serial/parallel converter SP1 converts the serial data into parallel data. The serial/parallel converter can be easily implemented by using, e.g., a shift register. For example, when the parallel data is 16 bits in size, the serial/parallel conversion is performed by setting the frequency ratio between the first serial clock and the first parallel clock at a 16-to-1, and using the first serial clock as the shift clock of the shift register, and extracting the data out of the 16-bit register on the first parallel clock. The parallel data generated are inputted into the data diverter DD1. From among the parallel data inputted therein and in accordance with a prescribed rule, the data diverter DD1 selects bit data equivalent to the parallel data which should be transmitted to the peripheral module PM1. Then, the data diverter DD1 passes the selected parallel data to the parallel transceiver PTV1, thereby transmitting the selected parallel data to the peripheral module PM1 via the parallel-signal transmission path 1015. The function of the data diverter DD1 is basically the same as that of the reception programmer RP explained earlier in the embodiment in FIG. 2. Also, the data diverter DD1 passes the parallel data to the parallel/serial converter PS1, thereby converting the parallel data into the serial data again. Then, the resultant serial data is transmitted from the serial transmitter ST1 to the relay RL2 via the differential serial-signal signal transmission path 1007. The diagram illustrates that the bit number of the parallel data inputted into the parallel/serial converter PS1 is equal to the bit number resulting from subtracting the bit number of the selected parallel data transmitted to the peripheral module PM1 from the bit number of the original parallel data. The original parallel data may also be transmitted such that it is subjected to the serial conversion just as it is. In this case, the relay RL1 can be configured as a general-purpose-mannered relay which is independent of the peripheral modules connected thereto. Meanwhile, the bits of the selected parallel data transmitted to the peripheral module PM1 may also be transmitted as H-level, L-level, or arbitrary data. In this case, the communications load can be reduced by more simplifying the frequency components in the serial transmission subsequent thereto. Also, there may be provided a not-illustrated signal path for transmitting the serial signal received from the microprocessor MPU1 to the relay RL2 just as it is, i.e., without letting the serial signal pass through the serial/parallel converter SP1 or the parallel/serial converter PS1.

The data to be transmitted to the microprocessor MPU1 are multiplexed and serialized in the relay RL2, and the resultant serial data is transmitted to the differential signal transmission path 1008 from the relay RL2. Simultaneously, the clock signal synchronized with the serial data is transmitted to the differential signal transmission path 1010. The relay RL1 receives these differential signals at a serial receiver SR2. The serial data received is inputted into a serial/parallel converter SP2. The clock signal received is distributed into a clock frequency-divider CDV2, the serial/parallel converter SP2, a parallel/serial converter PS2, and a serial transmitter ST2 via a clock-signal line 1215 within the relay RL1. Hereinafter, this clock signal will be referred to as "second serial clock". The clock frequency-divider CDV2 frequency-divides the second serial clock into a clock whose frequency is lower than that of the second serial clock. Hereinafter, this clock will be referred to as "second parallel clock". The second parallel clock is distributed into the serial/parallel converter SP2, a data jointer DJ1, the parallel/serial converter PS2, and the parallel transceiver PTV1 via a clock-signal line 1217 within the relay RL1. The serial/parallel converter SP2 converts the serial data into parallel data. The parallel data converted is inputted into the data jointer DJ1. Meanwhile, parallel data is transmitted from the peripheral module PM1 via the parallel-signal transmission path 1015, then being received at the parallel transceiver PTV1. The parallel data received is also inputted into the data jointer DJ1. The data jointer DJ1 generates one piece of parallel data which results from arranging the two pieces of inputted parallel data in accordance with a prescribed rule, then inputting the one piece of parallel data into the parallel/serial converter PS2. The parallel/serial converter PS2 converts the inputted parallel data into serial data. Then, the serial data is transmitted from a serial transmitter ST2. The serial data and the second serial clock are transmitted to the microprocessor MPU1 via the differential signal transmission path 1004 and the differential signal transmission path 1006, respectively.

Here, the relationship between FIG. 1 and FIG. 2 will be explained in FIG. 14. In FIG. 14, for simplicity of explanation, no explanation has been given to a viewpoint of selecting the different interfaces. On account of this, the correspondence relationship is pointed out here. The configuration in FIG. 1 is a configuration included in the parallel/serial converter PS1 and the serial transmitter ST1, or the parallel/serial converter PS2 and the serial transmitter ST2. Also, the configuration in FIG. 2 is a configuration included in the serial/parallel converter SP1 and the serial receiver SR1, or the serial/parallel converter SP2 and the serial receiver SR2.

Figure 15:
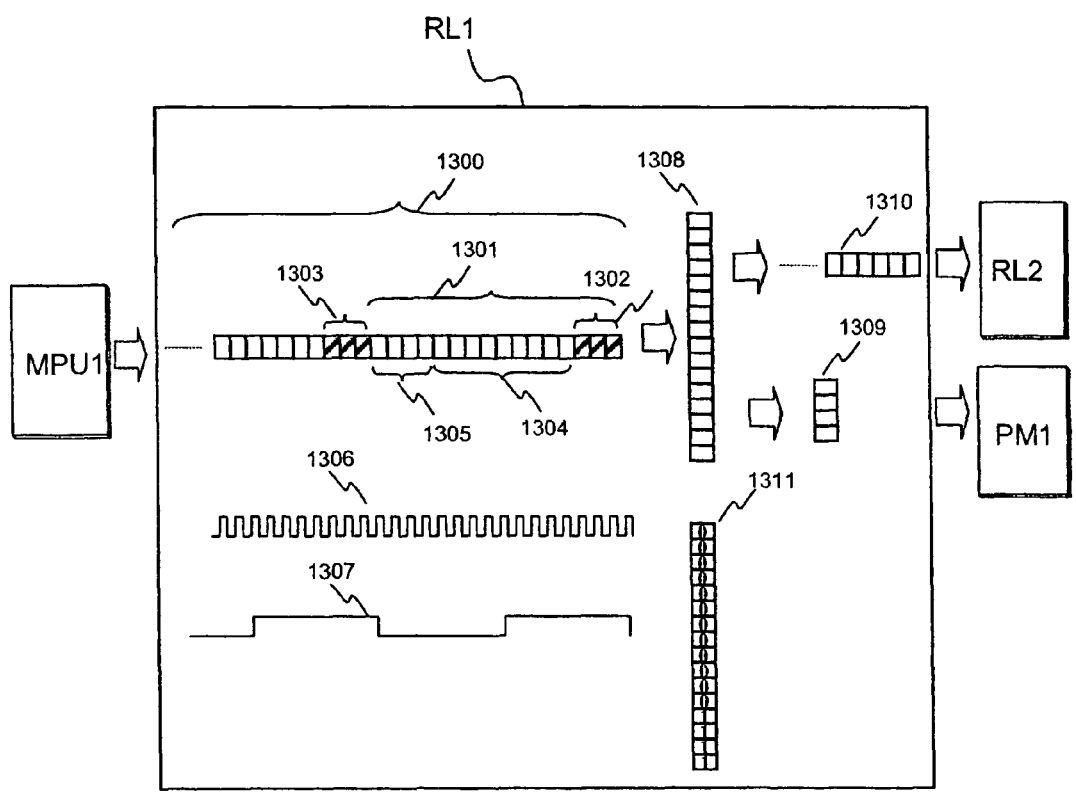
FIG. 15 is a diagram for explaining a data diversion processing in the relay.

Next, referring to FIG. 15, the explanation will be given below regarding the data diversion operation within the relay RL1. It is assumed that the serial data 1300 transmitted from the microprocessor MPU1 and received at the relay RL1 travels from left to right in the diagram. In the serial data 1300 synchronized with the serial clock 1306, a continuous data range which is referred to as "frame 1301" is dealt with as one assembled cluster. The structure of the frame 1301 is defined as the protocol of the signal transmission system. In this example, 16-bit data is defined as 1 frame, and a 3-bit frame synchronization bit 1302 or 1303 is inserted into the front-end of the 1 frame for indicating separation between the frames. Also, it is assumed that the transfer data to the relay RL2 is equal to 9 bits (1304) which follow the frame synchronization bit, and that the transfer data to the peripheral module PM1 is equal to the remaining 4 bits (1305). The serial/parallel converter SP1 converts the serial data into the parallel data in the 1-frame unit, i.e., on a 16-bit data basis. On account of this, the parallel clock 1307 is a clock resulting from frequency-dividing the serial clock 1306 into the one-sixteenth of the serial clock 1306. The parallel data 1308 by the amount of the 1 frame are inputted into the data diverter DD1. The data diverter DD1 selects only the parallel data 1309 which should be transmitted to the peripheral module PM1. Then, the selected parallel data 1309 are transferred from the parallel transceiver PTV1 to the peripheral module PM1. The remaining parallel data 1308 are serialized again, then being transmitted to the relay RL2 as the serial data 1310. A bit assignment register 1311 is used for selecting the parallel data 1309 which should be transmitted to the peripheral module PM1. In the present embodiment, the bit assignment register 1311 is formed into a structure where 1 is stored into the bit positions to be selected, and 0 is stored into the remaining bit positions. Incidentally, structures which are employable other than this structure are, e.g., a structure of memorizing the start bit position and final bit position of the bits to be selected, and a structure of memorizing the start bit position and the bit number. The bit assignment register 1311 exists not only in the relay RL1 but also in the relay RL2. By rewriting the contents of the bit assignment register, it becomes possible to change which bits (namely, from which start bit till which final bit) are to be allocated to which transfer destination. For example, as illustrated in FIG. 16(*a*), the following operation is possible: Namely, after the start-up of the system (S2001), the bit assignment register of each relay is set (S2002). After that, the system processings are performed in accordance with the setting (S2003 to S2005). In the case of not changing the bit assignment register, for example, each relay stores the data in advance into a not-illustrated nonvolatile memory (e.g., read-only memory or flash memory), and reads the data at the start-up time. In contrast thereto, it is possible to change the bit assignment register. For example, as illustrated in FIG. 16(*b*), the setting of an appropriate bit assignment register may be performed (S2012, S2014, and S2016) on each-processing basis (S2013, S2015, and S2017). This makes the effective signal transmission paths available. The change of the bit assignment register like this is performed in accordance with an instruction from the microprocessor MPU1. For example, this instruction is implementable by providing a control line for instructing the change of the bit assignment register like this between the microprocessor MPU1 and each relay.

Figure 17:
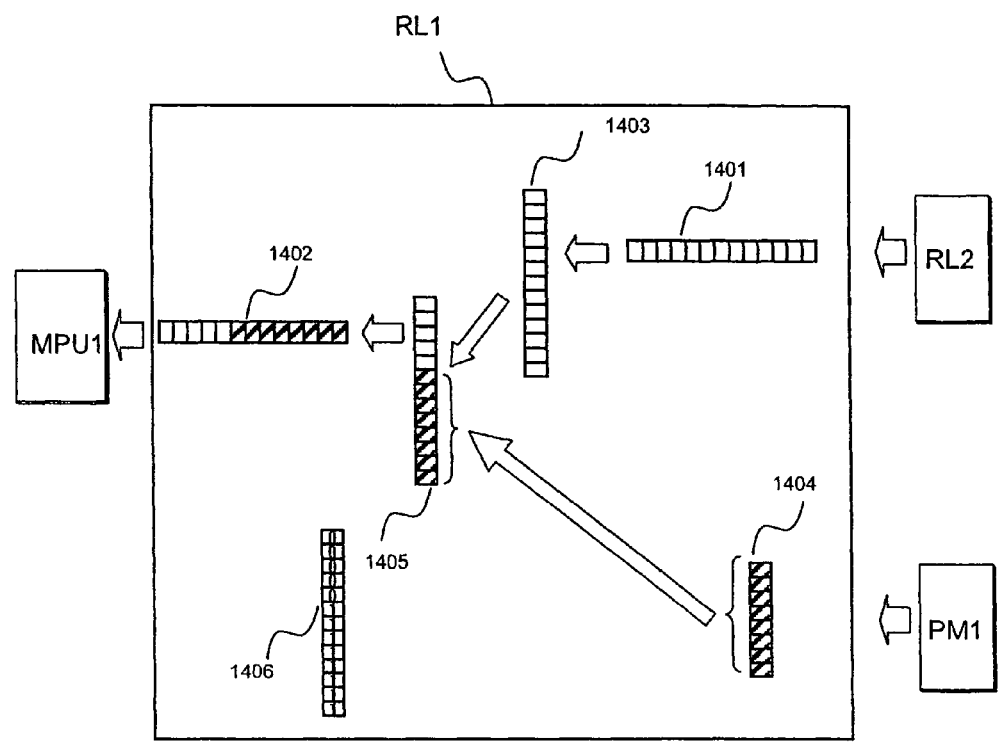
FIG. 17 is a diagram for explaining the data diversion processing in the relay.

Next, referring to FIG. 17, the explanation will be given below regarding the data jointing operation within the relay RL1. In FIG. 17, it is assumed that serial data 1401 which the relay RL1 receives from the relay RL2 travels from right to left in the diagram. Incidentally, in this example as well, it is assumed that the serial data has the same frame configuration as in the example in FIG. 15. In the present diagram, however, the frame synchronization bits are omitted, and only the 13-bit data corresponding to the bit data is illustrated. It is assumed that the transfer data from the relay RL2 to the microprocessor MPU1 is equal to 5 bits at the front-end. The serial/parallel converter SP2 converts the serial data into parallel data in the 1-frame unit. The parallel data 1403 by the amount of the 1 frame which has undergone the parallel conversion are inputted into the data jointer DJ1. Also, 8-bit parallel data 1404 which are inputted from the peripheral module PM1 are also inputted-into the data jointer DJ1. In the data jointer DJ1, the 8-bit parallel data 1404 to be transmitted from the peripheral module PM1 to the microprocessor MPU1 are embedded into the 13-bit parallel data 1403 which results from applying the parallel conversion to the serial data from the relay RL2. The bit positions to be embedded into are determined by making reference to a bit assignment register 1406. Similarly to FIG. 15, the bit assignment register 1406 is formed into a structure where 1 is stored into the bit positions to be embedded into, and 0 is stored into the remaining bit positions. Parallel data 1405 created in this way are converted into serial data 1402 by the parallel/serial converter PS2, then being transmitted to the microprocessor MPU1. The setting of the bit assignment register 1406 can also be given in much the same way as was explained in FIG. 16(*a*) and FIG. 16(*b*).

Figure 18:
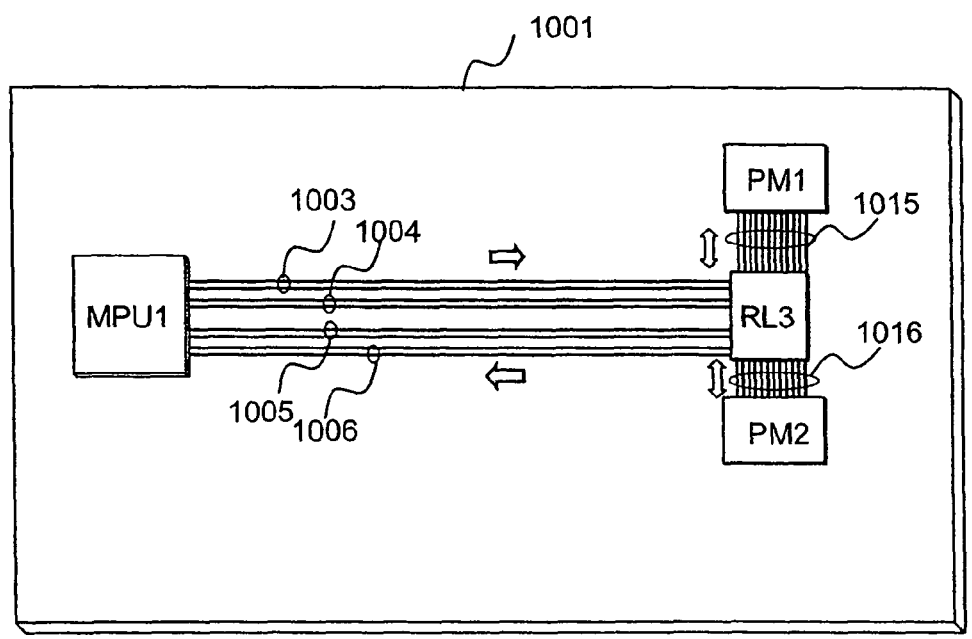
FIG. 18 is a diagram for illustrating still another configuration example of the signal transmission system of the present invention.

Incidentally, each relay in the present invention is not necessarily limited to a relay which should be connected to a single peripheral module. For example, FIG. 18 illustrates a system configuration where a relay has a plurality of parallel transceivers, and is connectable to a plurality of peripheral modules. FIG. 18 illustrates the system configuration example which, similarly to FIG. 12, includes the microprocessor MPU1 and the two peripheral modules PM1 and PM2 on the printed board 1001. The system configuration in FIG. 18, however, differs from FIG. 12 in a point that the relay RL3 is connected to both of the two peripheral modules PM1 and PM2 via the parallel-signal transmission paths 1015 and 1016.

Figure 19:
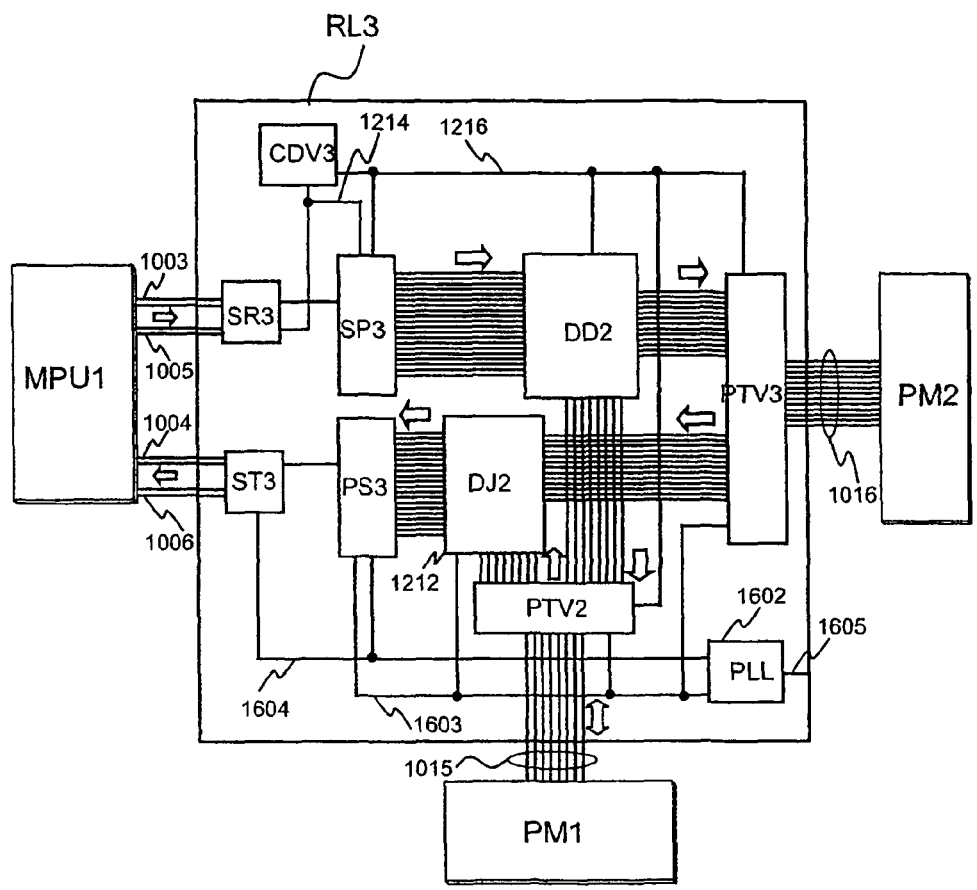
FIG. 19 is a diagram for illustrating another configuration example of the relay.

FIG. 19 illustrates the internal configuration of the relay RL3. From the microprocessor MPU1, a multiplexed serial signal to be transmitted to the two peripheral modules PM1 and PM2 is transmitted to the differential signal transmission path 1003. Simultaneously, a clock signal synchronized with the serial data is transmitted to the differential signal transmission path 1005. The relay RL3 receives these differential signals at a serial receiver SR3. The serial data received is inputted into a serial/parallel converter SP3. The clock signal received is distributed into a clock frequency-divider CDV3 and the serial/parallel converter SP3 via the clock-signal line 1214 within the relay RL3. Hereinafter, this clock signal will be referred to as "first serial clock". The clock frequency-divider CDV3 frequency-divides the first serial clock into a clock whose frequency is lower than that of the first serial clock. Hereinafter, this clock will be referred to as "first parallel clock". The first parallel clock is distributed into the serial/parallel converter SP3, a data diverter DD2, and parallel transceivers PTV2 and PTV3 via the clock-signal line 1216 within the relay RL3. The serial/parallel converter SP3 converts the serial data into parallel data. The parallel data generated are inputted into the data diverter DD2. From among the parallel data inputted therein and in accordance with a prescribed rule, the data diverter DD2 selects bits equivalent to parallel data transmitted to the peripheral module PM1, then passing the selected bits to the parallel transceiver PTV2. Also, the data diverter DD2 selects bits equivalent to parallel data transmitted to the peripheral module PM2, then passing the selected bits to the parallel transceiver PTV3. The parallel transceiver PTV2 transmits the received parallel data to the peripheral module PM1 via the parallel-signal transmission path 1015. Also, the parallel transceiver PTV3 transmits the received parallel data to the peripheral module PM2 via the parallel-signal transmission path 1016. Also, in order to transmit serial data to the microprocessor MPUL, there exists a phase locked loop (PLL) 1602 for generating a high-speed second serial clock and a low-speed second parallel clock. A clock source 1605 is inputted into the PLL 1602. The clock source 1605 is supplied from the microprocessor MPU1, or may be supplied from another clock source existing on the printed board. The second serial clock is supplied into a parallel/serial converter PS3 and a serial transmitter ST3 via a clock-signal line 1604 within the relay RL3. The second parallel clock is distributed into a data jointer DJ2, the parallel/serial converter PS3, and the parallel transceivers PTV2 and PTV3 via a clock-signal line 1603 within the relay RL3. Parallel data is transmitted from the peripheral module PM2 via the parallel-signal transmission path 1016, then being received at the parallel transceiver PTV3. The parallel data received at the parallel transceiver PTV3 is inputted into the data jointer DJ2. Meanwhile, parallel data is transmitted from the peripheral module PM1 via the parallel-signal transmission path 1015, then being received at the parallel transceiver PTV2. The parallel data received at the parallel transceiver PTV2 is inputted into the data jointer DJ2. The data jointer DJ2 generates one piece of parallel data which results from arranging the two pieces of inputted parallel data in accordance with a prescribed rule, then inputting the one piece of parallel data into the parallel/serial converter PS3. The parallel/serial converter PS3 converts the inputted parallel data into serial data. The serial data and the second serial clock transmitted from the serial transmitter ST3 are transmitted to the microprocessor MPU1 via the differential signal transmission path 1004 and the differential signal transmission path 1006, respectively.

Figure 20A:
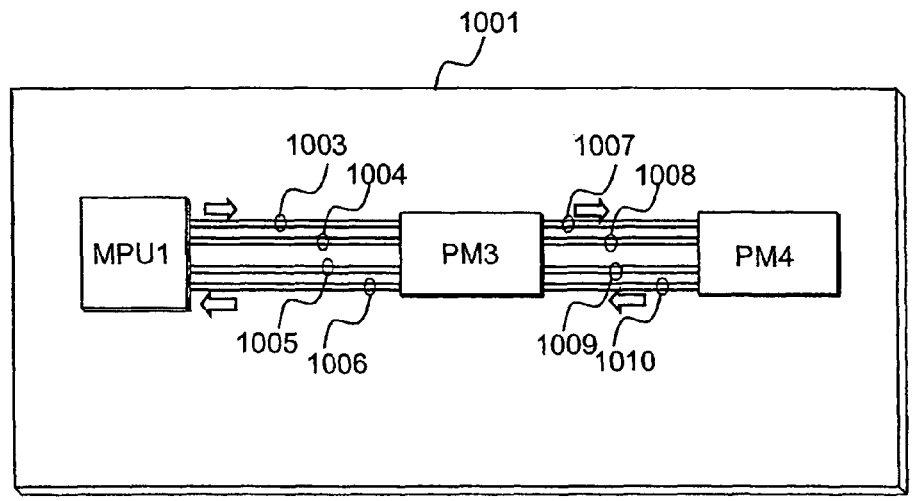
FIG. 20 is a diagram for illustrating still another configuration example of the signal transmission system of the present invention.
Figure 20B:
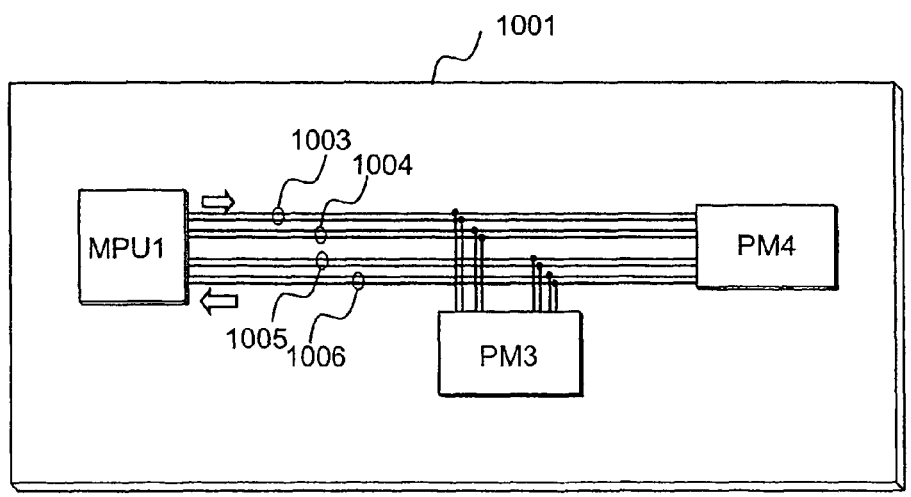

Each peripheral module itself may include the functions of each relay which has been explained so far. FIG. 20(a) illustrates a configuration example in the case where each peripheral module includes the functions of each relay in its inside. In FIG. 20(a), a peripheral module PM3 has the function of receiving a multiplexed serial signal from the microprocessor MPU1, fetching only the data transmitted to itself, and transmitting the serial data to a peripheral module PM4, and the function of receiving a serial signal from the peripheral module PM4, generating by itself a serial signal resulting from multiplexing data to be transmitted to the microprocessor MPU1, and transmitting the multiplexed serial signal to the microprocessor MPU1. The peripheral module PM4 can be implemented by having the function of receiving serial data and fetching only the data transmitted to itself, and the function of transmitting by itself data to be transmitted to the microprocessor MPU1 as a serial signal. FIG. 20(b) also illustrates the configuration example in the case where each peripheral module includes in its inside the functions of directly transmitting/receiving a serial signal without an intervention of the relay. This configuration, however, becomes the so-called bus connection where a plurality of peripheral modules are connected to the serial-signal signal transmission paths. In this example, although the reception method of receiving a serial signal by the microprocessor MPU1 and the peripheral modules PM3 and PM4 is basically the same as in FIG. 20(a), attention is must be paid at the time of the transmission. Namely, if the plurality of peripheral modules drive a transmission path simultaneously, collision of signals occurs, and thus transfer of normal data becomes impossible. Accordingly, a control becomes necessary, such as driving the transmission path only when bits assigned to each module are transmitted. Also, since branch portions exist on the signal transmission paths, reflection of a signal occurs. Consequently, this configuration is unsuitable for the case of performing the serial transmission of a high-frequency signal.

Figure 21:
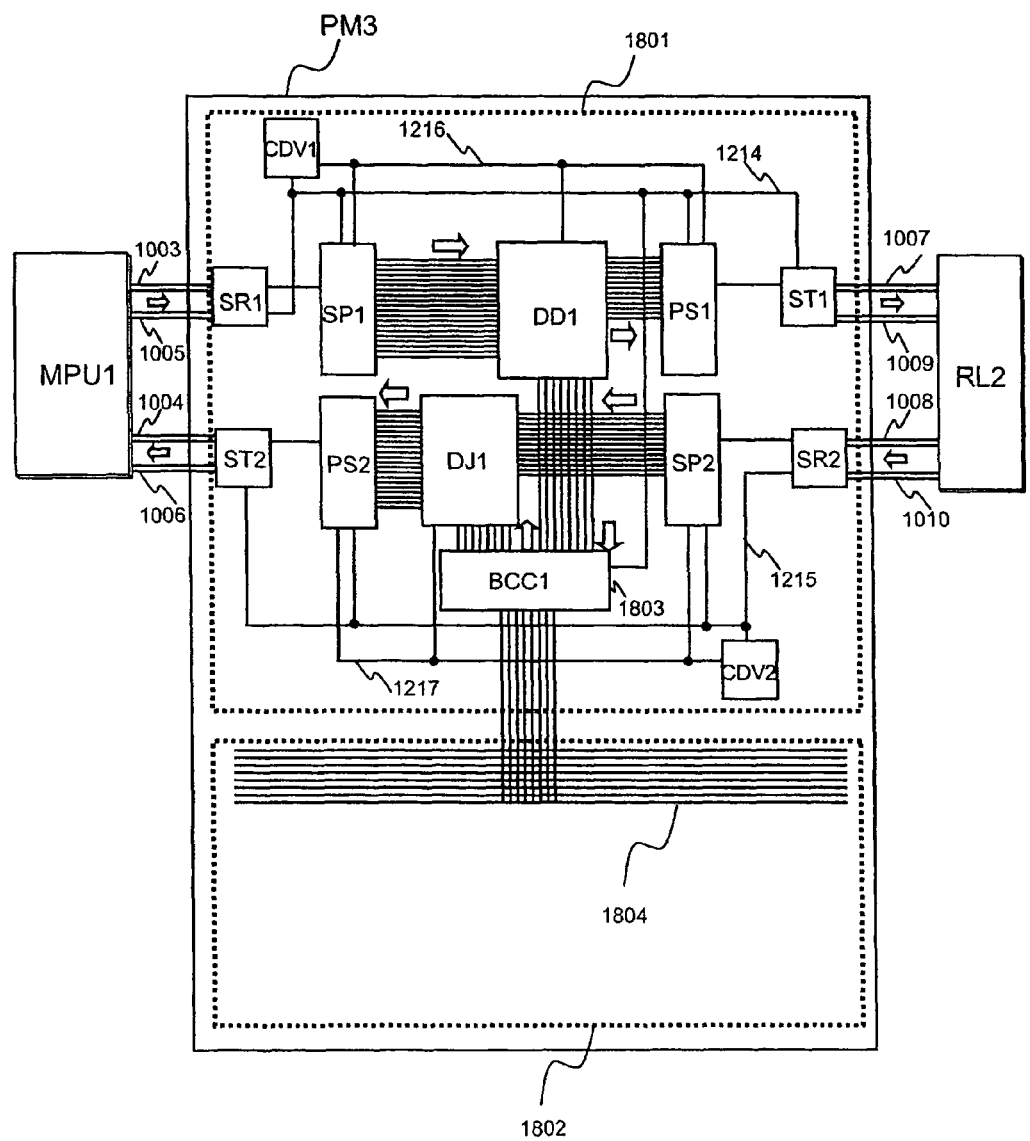
FIG. 21 is a diagram for illustrating a configuration example of a peripheral module.

FIG. 21 illustrates the internal configuration of the peripheral module PM3 in FIG. 20(a). The module PM3 includes a transmission unit 1801 and a main circuit 1802. The transmission unit 1801 is a circuit portion for exerting the same functions as those of the relay in the configuration example in FIG. 14 or the like. The point which differs therefrom is that, e.g., the parallel transceiver PTV1 within the relay RL1 in FIG. 14 is replaced by a bus-connection circuit BCC1 for performing the passing of data with internal buses 1804 of the main circuit 1802. The main circuit 1802 is a circuit portion for performing operations themselves of each peripheral module. The transmission unit 1801 is maintained as a design asset (IP), and is reused and distributed widely. This makes a lot of peripheral modules connectable to the system configuration of the present invention without using the relay.

Figure 22:
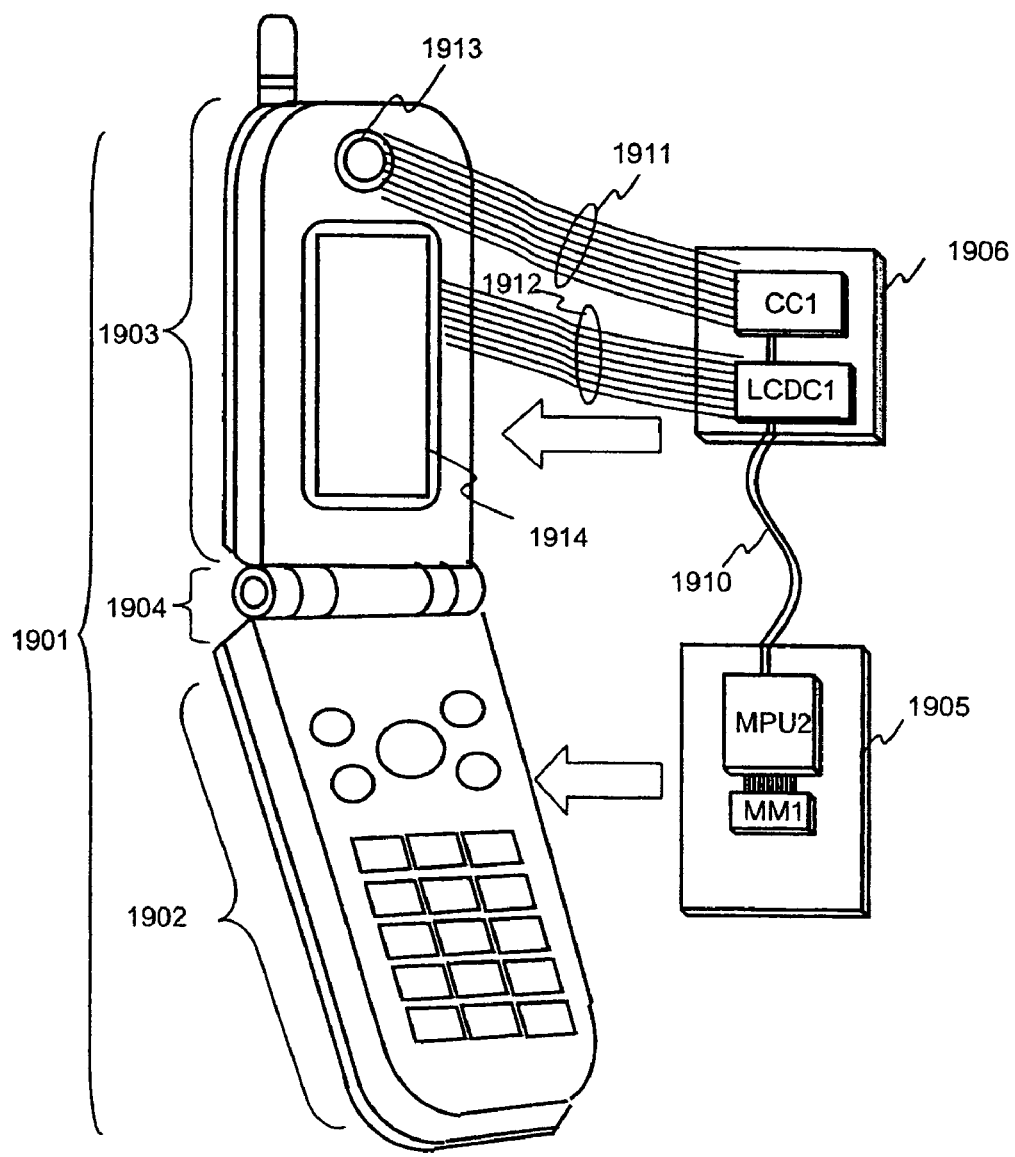
FIG. 22 is a diagram for illustrating an example where the signal transmission system is applied to a folding-type mobile telephone.

Furthermore, the present invention is not only limited to the signal transmission system on the one piece of printed board, but it is also applicable to a signal transmission system wherein signals are transmitted via cables on a plurality of printed boards, or to a signal transmission system among a plurality of devices. FIG. 22 illustrates an application example of the present invention to a folding-type mobile telephone as an application embodiment to the signal transmission system among a plurality of printed boards. The configuration of a folding-type mobile telephone 1901 is that a main housing 1902 and a sub housing 1903 are connected to each other by a movable hinge unit 1904. Mainly, operation keys are set up on the main housing 1902, and a camera 1913 and a liquid-crystal display 1914 are set up on the sub housing 1903. The microprocessor MPU2 is set up on a main board 1905, and is stored into the main housing 1902. Originally, on the main board 1905, not only the microprocessor MPU2 but also a large number of integrated circuits and passive elements are integrated at a high density. In the present diagram, however, these circuits and elements are omitted because they have nothing to do with the essence of the explanation. Accordingly, the present diagram illustrates only the microprocessor MPU2 and a memory module MM1 which is connected thereto via parallel-signal transmission paths. Meanwhile, a camera control integrated circuit CC1 and a liquid-crystal display control integrated circuit LCDC1 are set up on a sub board 1906, and are stored into the sub housing 1903. The camera control integrated circuit CC1 and the liquid-crystal display control integrated circuit LCDC1 are connected to the camera 1913 and the liquid-crystal display 1914 via parallel cables, respectively. In order to perform the data transfer, it is required to connect the microprocessor MPU2 to the camera control integrated circuit CC1 and the liquid-crystal display control integrated circuit LCDC1. In the prior arts, since this connection is implemented using parallel cables, it was required to pass a large number of wiring cables through the narrow hinge unit 1904. Then, there occurred a problem that rotations of the hinge unit apply heavy pressures on the wiring cables, and thereby break the wiring cables. Also, there occurred a problem that electromagnetic radiation noises are radiated from the large number of wiring cables passed through the narrow hinge unit. According to the signal transmission system of the present invention, the liquid-crystal display control integrated circuit LCDC1 and the camera control integrated circuit CC1 are connected to each other via a serial-signal signal transmission path on the sub board 1906. Moreover, the microprocessor MPU2 and the liquid-crystal display control integrated circuit LCDC1 are connected to each other via serial cables 1910 whose number is much smaller than the parallel cables. On account of this, the number of the wiring cables to be passed through the hinge unit can be reduced more significantly as compared with the prior arts. As a result, it becomes possible to lessen the problems of the line breaking and noises. In the configuration in FIG. 22, the memory module MM1 mounted on the main board 1905 is connected to the microprocessor MPU2 in accordance with not the serial-signal transmission scheme but the parallel-signal transmission scheme. Two reasons exist for this modification in the transmission scheme. The first reason lies in the mounting position relationship between the peripheral modules and the microprocessor. Similarly to the liquid-crystal display control integrated circuit LCDC1 and the camera control integrated circuit CC1, the memory module MM1 is one of the peripheral modules connected to the microprocessor MPU2. The liquid-crystal display control integrated circuit LCDC1 and the camera control integrated circuit CC1, however, are mounted on the sub board 1906 in order that they are made proximate to the sub housing 1903 on which the camera 1913 and the liquid-crystal display 1914 are set up. Unlike this, the connection of the memory module MM1 to the microprocessor MPU2 is established by arranging the memory module MM1 on the main board 1905 in order that the memory module MM1 is made proximate to the microprocessor MPU2. In the transfer to the different board as described earlier, as compared with the transfer within one and the same board, the more significant effect can be obtained by applying the serial-signal transmission scheme of the present invention which makes it possible to reduce the number of the wiring cables. This is one of the reasons for the above-described modification in the transmission scheme. In this application embodiment in particular, as explained above, it is required to pass the transfer cables to the sub board 1906 through the narrow hinge unit 1904. As a result, the effect of reducing the number of the wiring cables becomes even more significant. The second reason lies in a difference in the data transmission rate between the peripheral modules and the microprocessor. Assuming that the memory module MM1 is a 16-bit width and 60-MHz frequency operating SDRAM, the data transfer rate attains to 1 Gbps. Implementing the serial transmission of this data requires execution of the transfer on a 1-GHz serial clock. On the other hand, in the camera and the liquid-crystal display, an about 200-Mbps signal-transfer rate, i.e., a 200-MHz serial clock, is effective enough. The execution of the 1-GHz transfer on the board of the mobile telephone brings about rises in the design cost and anti-noise measure component cost for performing the proper and satisfactory signal transmission.

In this way, in the transmission system in FIG. 22, one of the futures is as follows: Namely, the multiplexed serial transmission is used between the modules which are mounted on the different boards; whereas the parallel transmission is used between the modules which are mounted on one and the same board. Based on a similar concept, the parallel transmission can be used between a plurality of modules (chips) implemented into one package; whereas the multiplexed serial transmission can be used between modules (chips) mounted on a board on which this package is implemented. Also, another future in this transmission system is that the data transmission rate between the modules subjected to the parallel connection is higher than the data transmission rate between the modules subjected to the serial connection. Of course, these futures are ones resulting from description on the general example. Accordingly, in individual systems, the modification in the transmission scheme is determined by taking into consideration the trade-off between the cost reduction effect and the cost rise. In other words, the serial transmission is not limited only to the transfer between different boards, or to the transfer at a low-speed bit rate. For example, even at a 1-GHz-or-more transmission rate, if the system is the one which, like a server or router, performs the high-speed signal transmission from originally, rises in the design cost and anti-noise measure component cost for performing the high-speed signal transmission are not so high in some cases. In this case, the application of the present invention becomes easier. Also, even in the transmission within one and the same board, the serial transmission is preferable in some cases, if the package cost can be significantly reduced by reducing the number of pins of the integrated circuits, or if the board cost can be significantly reduced by reducing the number of board wiring layers.

INDUSTRIAL APPLICABILITY

The present invention is applicable to modules such as general-purpose processor, signal processing processor, ASIC (Application Specific Integrated Circuit), gate array, FPGA (Field Programmable Gate Array), image processing processor, semiconductor memory, memory module, liquid-crystal display, plasma display, camera module, and sound-source chip. The present invention is further applicable to a system where the above-described modules are connected to each other using printed board and cables, such as computer system, mobile appliance system, consumer-oriented electronics system, in-package system, or system-in package.

The invention claimed is:
1. An integrated circuit device for multiplexing parallel data of a plurality of parallel interfaces into serial data, said integrated circuit device, comprising:
  a storage device, a signal send-out circuit which outputs data on a one-bit basis to a transmission path connected to said integrated circuit device, said data being stored in said storage device, an interface-signal selector which outputs parallel data of selected parallel interfaces to said storage device, said interface-signal selector being so configured as to be able to input said parallel data of said plurality of parallel interfaces, and a transfer programmer which issues a control signal to said interface-signal selector, said control signal notifying said interface-signal selector of said parallel interfaces which are to be selected thereby, wherein said storage device has a plurality of slots each storing the data output from the interface-signal selector for a respective parallel interface of the plurality of parallel interfaces as serial data, wherein said storage device has a header information part which stores header information indicating which one of said plurality of parallel interfaces uses which one of the plurality of slots and in order in which the interface-signal selector selects the parallel interfaces, and wherein said signal send-out circuit outputs said header information in addition to said serial data stored in said plurality of slots on a one bit basis to said transmission path.

2. The integrated circuit device according to claim 1, wherein said plurality of parallel interfaces differ from each other in at least one of transmission frequency, bit width of said data signal, configuration of said control signal, and transmission/reception protocol.

3. The integrated circuit device according to claim 1, wherein said transfer programmer detects a change in a single or a plurality of predetermined bit data included in said parallel data of said plurality of parallel interfaces, and determines parallel interfaces in which said change has occurred as said parallel interfaces which are to be selected by said interface-signal selector.

4. The integrated circuit device according to claim 1, wherein said transfer programmer receives an external selection signal from an external device, said external selection signal instructing necessity or unnecessity for said selection of each of said plurality of parallel interfaces, and, in accordance with said external selection signal, determines said parallel interfaces which are to be selected.

5. The integrated circuit device according to claim 1, wherein said transfer programmer holds first information about transmission frequency and bit width of each of said plurality of parallel interfaces, and generates said selection signal based on said first information.

6. The integrated circuit device according to claim 5, wherein said transfer programmer further holds second information about priorities among said plurality of parallel interfaces, and generates said selection signal based on said first information and said second information.

7. An integrated circuit device for reconstructing parallel data of a plurality of parallel interfaces from multiplexed serial data, said integrated circuit device, comprising:

a first storage device which has a plurality of slots that each stores data received from a transmission path connected to said integrated circuit device for a respective parallel interface of the plurality of parallel interfaces as serial data, the first storage device having a header information part which stores header information indicating which one of said plurality of parallel interfaces uses which one of the plurality of slots as serial data, a second storage device which stores said serial data in such a manner that said serial data is separated into said parallel data for each of said parallel interfaces, said serial data being stored into said first storage device, and a reception programmer which controls said data transmission from said first storage device to said second storage device based on a predetermined multiplexing rule, wherein said predetermined multiplexing rule is notified from another integrated circuit device from which said serial data is transmitted as said header information included in said transmitted serial data and indicates an order in which said parallel data for said plurality of parallel interfaces had been multiplexed.

* * * * *